US011919291B2

(12) United States Patent
Shimizu et al.

(10) Patent No.: US 11,919,291 B2
(45) Date of Patent: Mar. 5, 2024

(54) CHARACTERISTIC TABLE GENERATION SYSTEM, METHOD OF GENERATING CHARACTERISTIC TABLE, AND PROGRAM OF GENERATING CHARACTERISTIC TABLE

(71) Applicant: SII Printek Inc., Chiba (JP)

(72) Inventors: Takayuki Shimizu, Chiba (JP); Masakazu Hirata, Chiba (JP)

(73) Assignee: SII PRINTEK INC., Chiba (JP)

( * ) Notice: Subject to any disclaimer, the term of this patent is extended or adjusted under 35 U.S.C. 154(b) by 156 days.

(21) Appl. No.: 17/549,238

(22) Filed: Dec. 13, 2021

(65) Prior Publication Data

US 2022/0184941 A1 Jun. 16, 2022

(30) Foreign Application Priority Data

Dec. 16, 2020 (JP) ................................ 2020-208752
Aug. 31, 2021 (JP) ................................ 2021-141994

(51) Int. Cl.
*B41J 2/195* (2006.01)
*B41F 31/00* (2006.01)
*B41F 33/16* (2006.01)

(52) U.S. Cl.
CPC ............ *B41F 31/005* (2013.01); *B41F 33/16* (2013.01); *B41J 2/195* (2013.01)

(58) Field of Classification Search
CPC ....... B41J 2/195; B41J 2/04581; B41F 31/005
See application file for complete search history.

(56) References Cited

U.S. PATENT DOCUMENTS 7,573,179 B2 * 8/2009 Okuda ................. B41J 2/04581 310/317
2006/0082607 A1 * 4/2006 Takahashi ............ B41J 2/04581 347/10

(Continued)

FOREIGN PATENT DOCUMENTS

JP 2012-187850 A 10/2012

*Primary Examiner* — Lam S Nguyen
(74) *Attorney, Agent, or Firm* — Crowell & Moring LLP

(57) ABSTRACT

There are provided a characteristic table generation system and so on capable of enhancing the convenience of the user. The characteristic table generation system according to an embodiment of the present disclosure is a system for generating a predictive voltage characteristic table for defining a predictive characteristic curve, the system including a data acquisition section configured to obtain a measured viscosity characteristic table defining a measured characteristic curve between viscosity and temperature of the liquid, and a predetermined parameter separately, as input data, a conversion coefficient generation section configured to generate a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable, and a table generation section configured to perform the conversion process using the measured viscosity characteristic table and the conversion coefficient generated by the conversion coefficient generation section to thereby generate the predictive voltage characteristic table.

14 Claims, 25 Drawing Sheets

(56) References Cited

U.S. PATENT DOCUMENTS

2012/0105520 A1* 5/2012 Shimoda .................. B41J 2/195 347/6
2012/0229543 A1 9/2012 Hayashi
2016/0067962 A1* 3/2016 De Saint Romain .. C09D 11/30 347/6

* cited by examiner

FIG. 6A
FIG. 6B
FIG. 6C
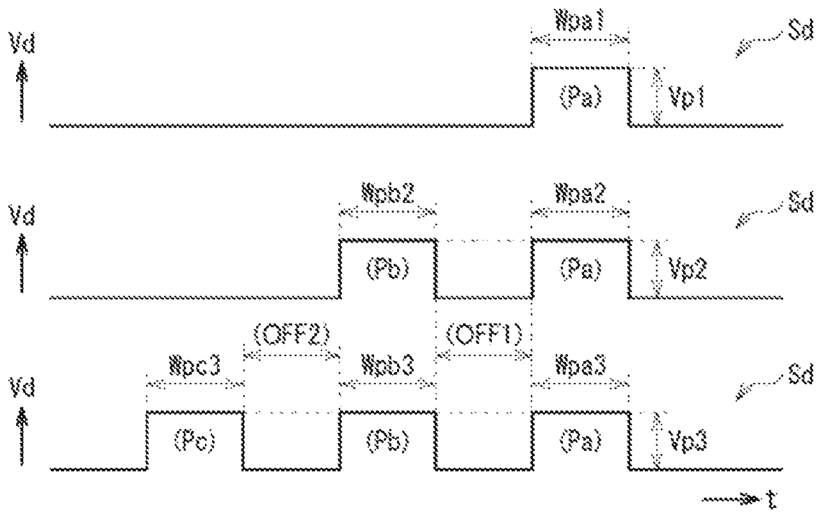
FIG. 7
COMPARATIVE EXAMPLE
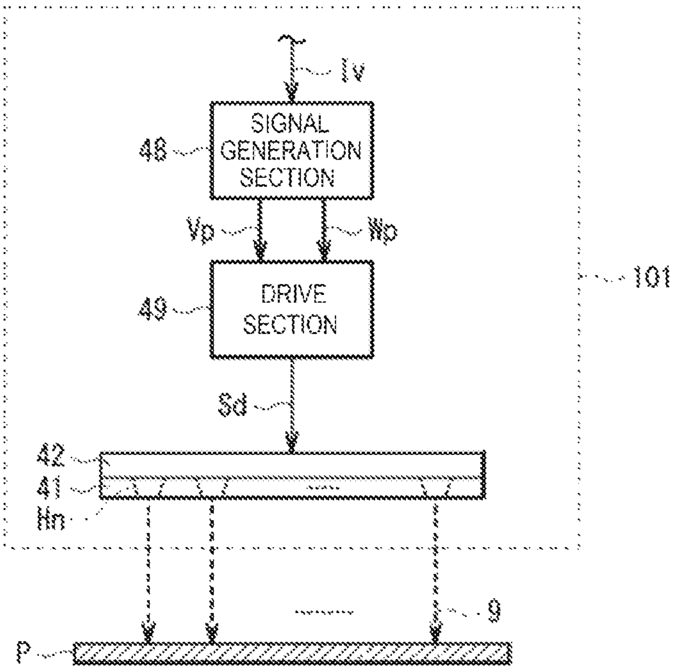

FIG. 12

(OBJECTIVE VARIABLE Kc)

| | Sample1 | Sample2 | Sample3 | Sample4 | Sample5 | Sample6 |
|---|---|---|---|---|---|---|
| EXPLANATORY VARIABLES | VALUE OF INPUT PARAMETER Pr | | | | | |
| NUMBER OF DROPS (NUMBER OF PULSES) | 1 | 7 | 1 | 3 | 3 | 1 |
| PRESENCE OR ABSENCE OF COMMON DRIVE [0: ABSENCE, 1: PRESENCE, 2: SPECIAL VALUE] | 2 | 1 | 1 | 1 | 1 | 0 |
| HEAD TYPE | A | B | C | A | A | D |
| INK TYPE | Oil | Oil | sol | UV | UV | WB |
| (Vj STANDARD or DV STANDARD) | DV | Vj | Vj | DV | Vj | Vj |
| HEAD RANK VALUE (INHERENT IN HEAD)[V] | 21.5 | 22.5 | 19.2 | 21.2 | 21.2 | 21.5 |
| VISCOSITY VALUE AT REFERENCE TEMPERATURE T[mPa] | 18.42 | 26.18 | 7.98 | 14.11 | 14.11 | 9.32 |
| VOLTAGE SENSITIVITY IN EJECTION Vr(Vj or DV) | 1.30 | 0.63 | 0.99 | 2.49 | 0.78 | 0.60 |
| SURFACE TENSION VALUE OF INK 9 [mN/m] | 29.89 | 29.65 | 29.28 | 23.28 | 23.28 | 43.20 |
| SPECIFIC GRAVITY VALUE OF INK 9 | 1.204 | 1.368 | 0.998 | 1.232 | 1.232 | 1.087 |
| ΔVp [V] | 20.974 | 24.222 | 17.218 | 23.790 | 23.972 | 22.432 |
| EJECTION SPEED OR TARGET VALUE OF DV | 20 | 7 | 6 | 38 | 7 | 5 |

Pr

FIG. 15
| | Sample1 | Sample2 | Sample3 | Sample4 | Sample5 | Sample6 |
|---|---|---|---|---|---|---|
| Kc(MEASURED VALUE) | 1.80 | 1.88 | 1.15 | 1.40 | 1.07 | 1.12 |
| Kc(SVM PREDICTED VALUE) | 1.88 | 1.86 | 1.10 | 1.51 | 1.18 | 1.12 |
| Kc(RF PREDICTED VALUE) | 1.90 | 1.86 | 1.21 | 1.38 | 1.20 | 1.12 |
FIG. 16A
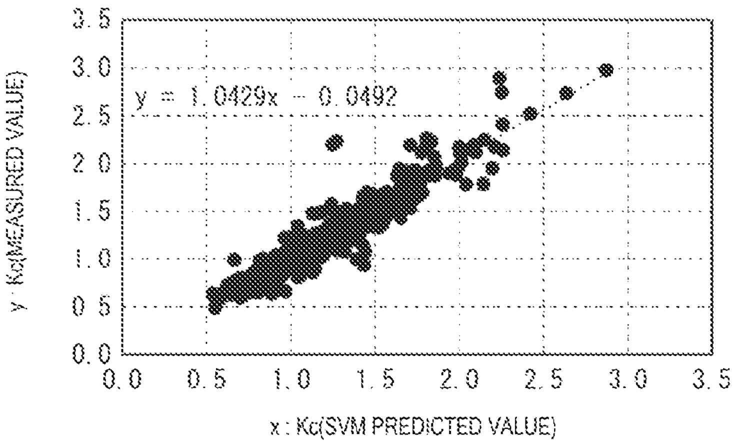
FIG. 16B
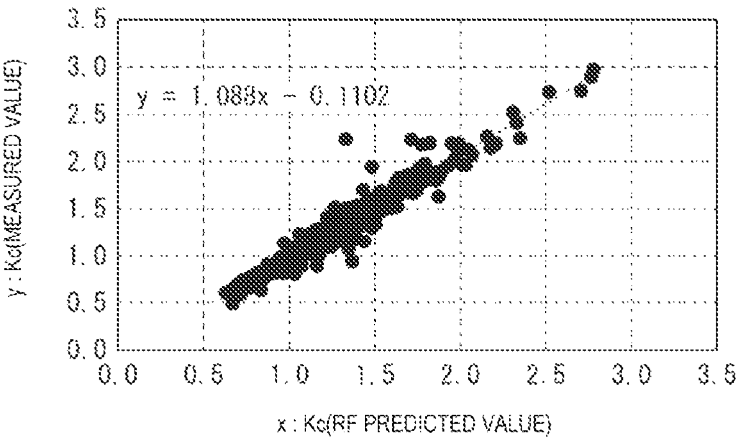

FIG. 19

MODIFIED EXAMPLE 1

(OBJECTIVE VARIABLE : Vr)

| | Sample1 | Sample2 | Sample3 | Sample4 | Sample5 | Sample6 |
|---|---|---|---|---|---|---|
| EXPLANATORY VARIABLES | VALUE OF INPUT PARAMETER Pr | | | | | |
| NUMBER OF DROPS (NUMBER OF PULSES) | 10 | 6 | 3 | 1 | 1 | 3 |
| PRESENCE OR ABSENCE OF COMMON DRIVE [0: ABSENCE, 1: PRESENCE, 2: SPECIAL VALUE] | 0 | 1 | 1 | 1 | 0 | 1 |
| HEAD TYPE | B | A | B | B | D | A |
| INK TYPE | Oil | sol | Oil | Oil | WB | Oil |
| (Vj STANDARD or DV STANDARD) | Vj | DV | DV | Vj | Vj | DV |
| HEAD RANK VALUE (INHERENT IN HEAD)[V] | 22. 5 | 21. 7 | 22. 5 | 22. 9 | 21. 8 | 22 |
| VISCOSITY VALUE AT REFERENCE TEMPERATURE Tr[mPa] | 20. 45 | 9. 84 | 26. 29 | 10. 55 | 10. 10 | 17. 95 |
| SURFACE TENSION VALUE OF INK 9 [mN/m] | 30. 39 | 30. 90 | 29. 65 | 31. 62 | 35. 49 | 29. 14 |
| SPECIFIC GRAVITY VALUE OF INK 9 | 1. 052 | 0. 99 | 1. 368 | 0. 9 | 1. 158 | 1. 364 |
| EJECTION SPEED OR TARGET VALUE OF DV | 6 | 89. 5 | 60 | 7 | 5 | 40 |
| ΔVp [V] | 27. 3313 | 21. 6443 | 25. 1106 | 21. 0208 | 23. 2532 | 20. 2429 |

Pr

MODIFIED EXAMPLE 1

| | Sample1 | Sample2 | Sample3 | Sample4 | Sample5 | Sample6 |
|---|---|---|---|---|---|---|
| Vr(MEASURED VALUE) | 0.63 | 5.73 | 3.61 | 0.90 | 0.61 | 3.06 |
| Vr(SVM PREDICTED VALUE) | 0.53 | 5.83 | 4.03 | 0.75 | 0.59 | 2.99 |
| Vr(RF PREDICTED VALUE) | 0.59 | 5.98 | 3.76 | 0.90 | 0.61 | 2.99 |

FIG. 25

MODIFIED EXAMPLE 2

(OBJECTIVE VARIABLE : ΔVp)

| | Sample1 | Sample2 | Sample3 | Sample4 | Sample5 | Sample6 |
|---|---|---|---|---|---|---|
| EXPLANATORY VARIABLES | VALUE OF INPUT PARAMETER Pr | | | | | |
| NUMBER OF DROPS (NUMBER OF PULSES) | 1 | 1 | 3 | 5 | 5 | 4 |
| PRESENCE OR ABSENCE OF COMMON DRIVE (0: ABSENCE, 1: PRESENCE, 2: SPECIAL VALUE) | 1 | 0 | 1 | 1 | 0 | 0 |
| HEAD TYPE | C | D | B | B | A | A |
| INK TYPE | sol | WB | Oil | UV | WB | WB |
| (Vj STANDARD or DV STANDARD) | Vj | Vj | DV | DV | Vj | Vj |
| HEAD RANK VALUE (INHERENT IN HEAD)[V] | 19.2 | 23 | 22.8 | 23.3 | 22.9 | 22.3 |
| VISCOSITY VALUE AT REFERENCE TEMPERATURE Tr[mPa] | 8.47 | 9.49 | 15.91 | 8.47 | 8.57 | 9.62 |
| VOLTAGE SENSITIVITY IN EJECTION Vr[V] or DV) | 0.96 | 0.63 | 4.29 | 6.34 | 0.50 | 0.40 |
| SURFACE TENSION VALUE OF INK 9 [mN/m] | 29.1 | 30.8 | 28.23 | 23.11 | 27.81 | 25.99 |
| SPECIFIC GRAVITY VALUE OF INK 9 | 0.986 | 1.105 | 1.127 | 1.085 | 1.116 | 1.062 |
| EJECTION SPEED OR TARGET VALUE OF DV | 6 | 5 | 51 | 62 | 7 | 6.5 |

Pr

FIG. 27
MODIFIED EXAMPLE 2
| | Sample1 | Sample2 | Sample3 | Sample4 | Sample5 | Sample6 |
|---|---|---|---|---|---|---|
| ΔVp(MEASURED VALUE) | 17.05 | 22.66 | 20.70 | 19.07 | 25.06 | 26.89 |
| ΔVp(SVM PREDICTED VALUE) | 17.67 | 23.49 | 20.80 | 19.17 | 25.06 | 26.79 |
| ΔVp(RF PREDICTED VALUE) | 16.45 | 22.61 | 21.01 | 19.08 | 25.00 | 27.00 |
FIG. 28A
MODIFIED EXAMPLE 2
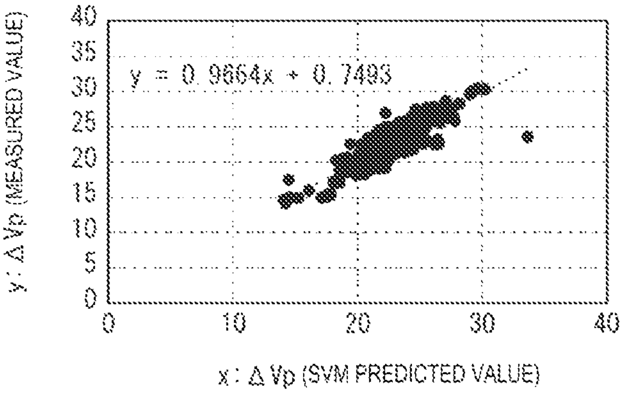
FIG. 28B
MODIFIED EXAMPLE 2
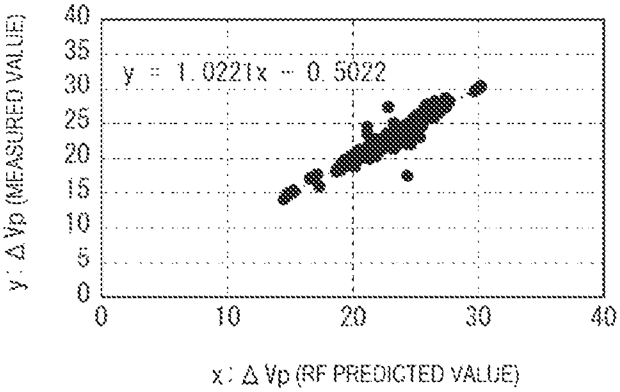

CHARACTERISTIC TABLE GENERATION SYSTEM, METHOD OF GENERATING CHARACTERISTIC TABLE, AND PROGRAM OF GENERATING CHARACTERISTIC TABLE

RELATED APPLICATIONS

This application claims priority to Japanese Patent Application No. 2020-208752, filed on Dec. 16, 2020 and Japanese Patent Application No. 2021-141994, filed on Aug. 31, 2021, the entire contents of which are incorporated herein by reference.

BACKGROUND OF THE INVENTION

1. Field of the Invention

The present disclosure relates to a characteristic table generation system, a method of generating a characteristic table, and a program of generating a characteristic table.

2. Description of the Related Art

Liquid jet recording devices equipped with liquid jet heads are used in a variety of fields, and a variety of types of liquid jet heads have been developed (see, e.g., JP-A-2012-187850).

In such liquid jet heads, it is required to enhance the convenience of the user.

It is desirable to provide a characteristic table generation system, a method of generating a characteristic table, and a program of generating a characteristic table each capable of enhancing the convenience of the user.

SUMMARY OF THE INVENTION

A characteristic table generation system according to an embodiment of the present disclosure is a characteristic table generation system configured to generate a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the characteristic table generation system including a data acquisition section configured to obtain a measured viscosity characteristic table defining a measured characteristic curve between viscosity and temperature of the liquid, and a predetermined parameter separately, as input data, a conversion coefficient generation section configured to generate a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable, and a table generation section configured to perform the conversion process using the measured viscosity characteristic table and the conversion coefficient generated by the conversion coefficient generation section to thereby generate the predictive voltage characteristic table.

A method of generating a characteristic table according to an embodiment of the present disclosure is a method of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet a liquid, the method including obtaining a measured viscosity characteristic table defining a measured characteristic curve between viscosity of the liquid and temperature, and a predetermined parameter separately as input data, generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable, and performing the conversion process using the measured viscosity characteristic table and the conversion coefficient generated to thereby generate the predictive voltage characteristic table.

A program of generating a characteristic table according to an embodiment of the present disclosure is a program of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet a liquid, the program making a computer execute a process including obtaining a measured viscosity characteristic table defining a measured characteristic curve between viscosity of the liquid and temperature, and a predetermined parameter separately as input data, generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable, and performing the conversion process using the measured viscosity characteristic table and the conversion coefficient generated to thereby generate the predictive voltage characteristic table.

According to the characteristic table generation system, the method of generating the characteristic table, and the program of generating the characteristic table related to the embodiments of the present disclosure, it becomes possible to enhance the convenience of the user.

BRIEF DESCRIPTION OF THE DRAWINGS

FIGS. 6A, 6B and 6C are each a timing chart schematically showing a configuration example of a drive signal.

FIG. 7 is a block diagram showing a schematic configuration example of a liquid jet recording device according to a comparative example.

FIG. 12 is a diagram showing an example of predetermined parameters related to the embodiment.

FIG. 15 is a diagram showing an example of predicted values by the machine learning and a measured value related to the embodiment.

FIG. 16A is a diagram showing an example of a correspondence relationship between an SVM predicted value and the measured value shown in FIG. 15.

FIG. 16B is a diagram showing an example of a correspondence relationship between an RF predicted value and the measured value shown in FIG. 15.

FIG. 19 is a diagram showing an example of predetermined parameters related to Modified Example 1.

FIG. 25 is a diagram showing an example of predetermined parameters related to Modified Example 2.

FIG. 27 is a diagram showing an example of predicted values by the machine learning and a measured value related to Modified Example 2.

FIG. 28A is a diagram showing an example of a correspondence relationship between the SVM predicted value and the measured value shown in FIG. 27.

FIG. 28B is a diagram showing an example of a correspondence relationship between the RF predicted value and the measured value shown in FIG. 27.

DETAILED DESCRIPTION OF THE PREFERRED EMBODIMENTS

An embodiment of the present disclosure will hereinafter be described in detail with reference to the drawings. It should be noted that the description will be presented in the following order.

1. Embodiment (an example in which an information processing section is disposed in an information processing device located outside a liquid jet recording device)
2. Modified Examples
   - Modified Example 1 (an example further provided with a machine learning model taking voltage sensitivity as an objective variable)
   - Modified Example 2 (an example further provided with a machine learning model taking voltage shift amount as the objective variable)
   - Modified Example 3 (an example in which the information processing section is disposed in a server located outside the liquid jet recording device)
   - Modified Example 4 (an example in which the information processing section is disposed inside a liquid jet head in the liquid jet recording device)
   - Modified Example 5 (an example in which the information processing section is disposed outside the liquid jet head in the liquid jet recording device)
   - Modified Example 6 (an example in which a signal generation section is further disposed in the information processing section)
3. Other Modified Examples

1. EMBODIMENT

[A. Overall Configuration of Printer 1]

Figure 1:
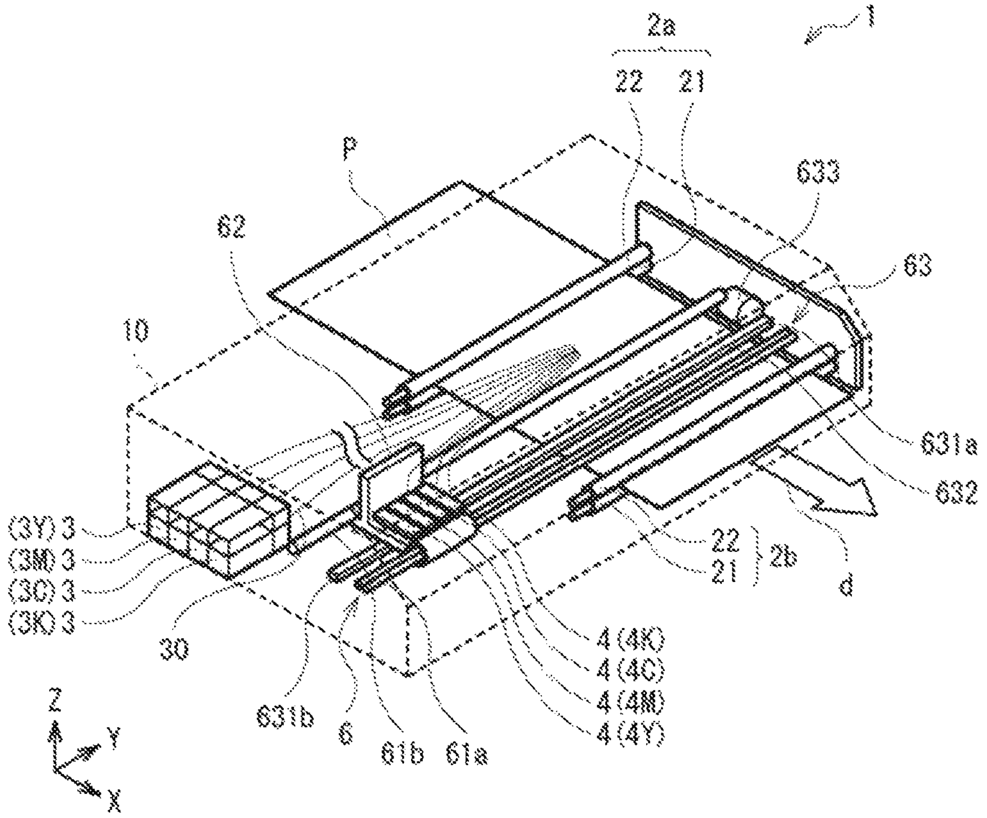
FIG. 1 is a schematic perspective view showing a schematic configuration example of a liquid jet recording device according to an embodiment of the present disclosure.

FIG. 1 is a perspective view schematically showing a schematic configuration example of a printer 1 as the liquid jet recording device according to an embodiment of the present disclosure. The printer 1 is an inkjet printer for performing recording (printing) of images, characters, and the like on recording paper P as a recording target medium using ink 9 described later.

As shown in FIG. 1, the printer 1 is provided with a pair of carrying mechanisms 2*a*, 2*b*, ink tanks 3, ink supply tubes 30, inkjet heads 4, and a scanning mechanism 6. These members are housed in a chassis 10 having a predetermined shape. It should be noted that the scale size of each of the members is accordingly altered so that the member is shown large enough to recognize in the drawings used in the description of the specification.

Here, the printer 1 corresponds to a specific example of the "liquid jet recording device" in the present disclosure, and the inkjet heads 4 (the inkjet heads 4Y, 4M, 4C, and 4K described later) each correspond to a specific example of a "liquid jet head" in the present disclosure. Further, the ink 9 corresponds to a specific example of a "liquid" in the present disclosure.

As shown in FIG. 1, the carrying mechanisms 2*a*, 2*b* are each a mechanism for carrying the recording paper P along a carrying direction d (an X-axis direction). These carrying mechanisms 2*a*, 2*b* each have a grit roller 21, a pinch roller 22, and a drive mechanism (not shown). This drive mechanism is a mechanism for rotating (rotating in a Z-X plane) the grit roller 21 around an axis, and is constituted by, for example, a motor.

(Ink Tanks 3)

The ink tank 3 is a tank for containing the ink 9 inside. As the ink tanks 3, there are provided four types of tanks for individually containing four colors of ink 9, namely yellow (Y), magenta (M), cyan (C), and black (K), in this example as shown in FIG. 1. Specifically, there are disposed the ink tank 3Y for containing the yellow ink 9, the ink tank 3M for containing the magenta ink 9, the ink tank 3C for containing the cyan ink 9, and the ink tank 3K for containing the black ink 9. These ink tanks 3Y, 3M, 3C, and 3K are arranged side by side along the X-axis direction inside the chassis 10.

It should be noted that the ink tanks 3Y, 3M, 3C, and 3K have the same configuration except the color of the ink 9 contained, and are therefore collectively referred to as ink tanks 3 in the following description.

(Inkjet Heads 4)

The inkjet heads 4 are each a head for jetting (ejecting) the ink 9 shaped like a droplet from a plurality of nozzles (nozzle holes Hn) described later to the recording paper P to thereby perform recording (printing) of images, characters, and so on. As the inkjet heads 4, there are also disposed four types of heads for individually jetting the four colors of ink 9 respectively contained in the ink tanks 3Y, 3M, 3C, and 3K described above in this example as shown in FIG. 1. Specifically, there are disposed the inkjet head 4Y for jetting the ink 9 as yellow ink, the inkjet head 4M for jetting the ink 9 as magenta ink, the inkjet head 4C for jetting the ink 9 as cyan ink, and the inkjet head 4K for jetting the ink 9 as black ink. These inkjet heads 4Y, 4M, 4C and 4K are arranged side by side along the Y-axis direction inside the chassis 10.

Figure 2:
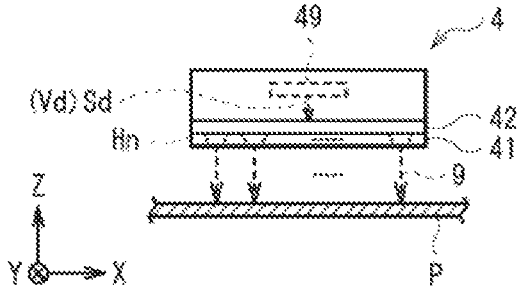
FIG. 2 is a schematic diagram showing a schematic configuration example of a liquid jet head shown in FIG. 1.

It should be noted that the inkjet heads 4Y, 4M, 4C and 4K have the same configuration except the color of the ink 9 used therein, and are therefore collectively referred to as inkjet heads 4 in the following description. Further, the detailed configuration example of the inkjet heads 4 will be described later in detail (FIG. 2).

The ink supply tubes 30 are each a tube through which the ink 9 is supplied from the inside of the ink tank 3 toward the inside of the inkjet head 4. The ink supply tubes 30 are each formed of, for example, a flexible hose having such flexibility as to be able to follow the action of the scanning mechanism 6 described below.

(Scanning Mechanism 6)

The scanning mechanism 6 is a mechanism for making the inkjet heads 4 perform a scanning operation along the width direction (the Y-axis direction) of the recording paper P. As shown in FIG. 1, the scanning mechanism 6 has a pair of guide rails 61*a*, 61*b* disposed so as to extend along the Y-axis direction, a carriage 62 movably supported by these guide rails 61*a*, 61*b*, and a drive mechanism 63 for moving the carriage 62 along the Y-axis direction.

The drive mechanism 63 has a pair of pulleys 631*a*, 631*b* disposed between the guide rails 61*a*, 61*b*, an endless belt 632 wound between these pulleys 631*a*, 631*b*, and a drive motor 633 for rotationally driving the pulley 631*a*. Further, on the carriage 62, there are arranged the four types of inkjet heads 4Y, 4M, 4C and 4K described above side by side along the Y-axis direction.

It should be noted that it is arranged that such a scanning mechanism 6 and the carrying mechanisms 2*a*, 2*b* described above constitute a moving mechanism for moving the inkjet heads 4 and the recording paper P relatively to each other.

[B. Detailed Configuration of Inkjet Heads 4]

Then, the detailed configuration example of the inkjet heads 4 will be described with reference to FIG. 2.

FIG. 2 is a diagram schematically showing the schematic configuration example of each of the inkjet heads 4.

As shown in FIG. 2, the inkjet head 4 has a nozzle plate 41, an actuator plate 42, and a drive section 49.

It should be noted that the nozzle plate 41 and the actuator plate 42 correspond to a specific example of a "jet section" in the present disclosure.

(Nozzle Plate 41)

As shown in FIG. 2, the nozzle plate 41 is a plate formed of a film material such as polyimide, or a metal material, and has the plurality of nozzle holes Hn for jetting the ink 9 (see the dotted arrows in FIG. 2). These nozzle holes Hn are formed side by side in alignment (along the X-axis direction in this example) at predetermined intervals.

(Actuator Plate 42)

The actuator plate 42 is a plate formed of a piezoelectric material such as PZT (lead zirconate titanate). The actuator plate 42 is provided with a plurality of channels (not shown). These channels are each a part functioning as a pressure chamber for applying a pressure to the ink 9, and are arranged side by side so as to be parallel to each other at predetermined intervals. Each of the channels is partitioned with drive walls (not shown) formed of a piezoelectric body, and forms a groove section having a recessed shape in a cross-sectional view.

In such channels, there exist ejection channels for ejecting the ink 9, and dummy channels (non-ejection channels) which do not eject the ink 9. In other words, it is arranged that the ejection channels are filled with the ink 9 on the one hand, but the dummy channels are not filled with the ink 9 on the other hand. Further, it is arranged that each of the ejection channels is communicated with the nozzle hole Hn in the nozzle plate 41 on the one hand, but each of the dummy channels is not communicated with the nozzle hole Hn on the other hand. The ejection channels and the dummy channels are alternately arranged side by side along a predetermined direction.

On the inner side surfaces opposed to each other in the drive wall described above, there are respectively disposed drive electrodes (not shown). As the drive electrodes, there exist common electrodes disposed on the inner side surfaces facing the ejection channels, and active electrodes (individual electrodes) disposed on the inside surfaces facing the dummy channels. These drive electrodes and the drive circuit in a drive board (not shown) are electrically coupled to each other via a plurality of extraction electrodes provided to a flexible board (not shown). Thus, it is arranged that a drive voltage Vd (a drive signal Sd) is applied to each of the drive electrodes from the drive circuit including the drive section 49 via the flexible board.

(Drive Section 49)

The drive section 49 is a section which applies the drive voltages Vd (the drive signals Sd) described above to the actuator plate 42 to expand or contract the ejection channels described above to thereby jet (make the actuator plate 42 perform the jetting operation of) the ink 9 from the respective nozzle holes Hn (see FIG. 2). Specifically, the drive section 49 is arranged to make the actuator plate 42 perform such a jet operation using the drive signal Sd generated in a signal generation section 48 described later.

[C. Overall Configuration of Characteristic Table Generation System 5]

Then, an overall configuration example of a characteristic table generation system 5 configured including the printer 1 having the inkjet heads 4 described above will be described with reference to FIG. 3 through FIG. 6C.

Figure 3:
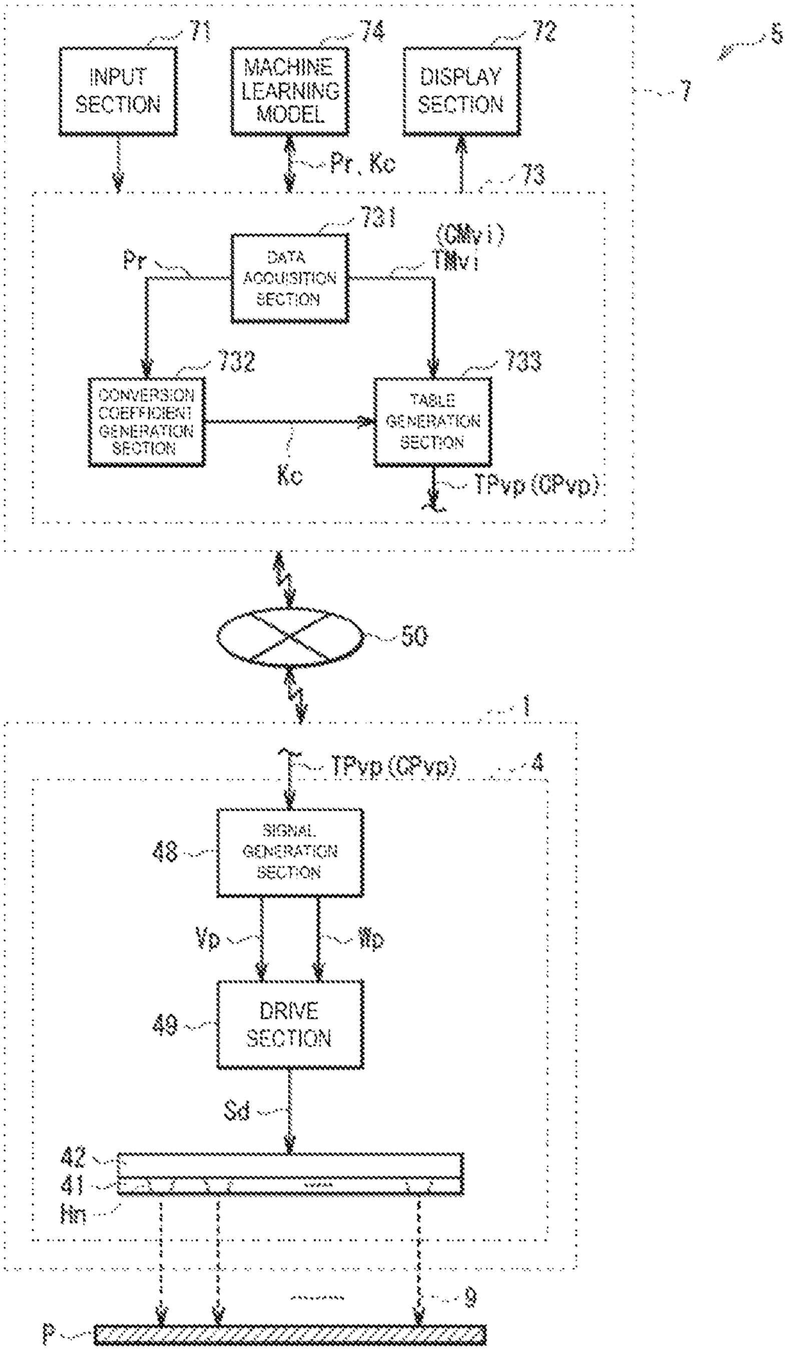
FIG. 3 is a functional block diagram showing a configuration example of a characteristic table generation system according to the embodiment.
Figure 4:
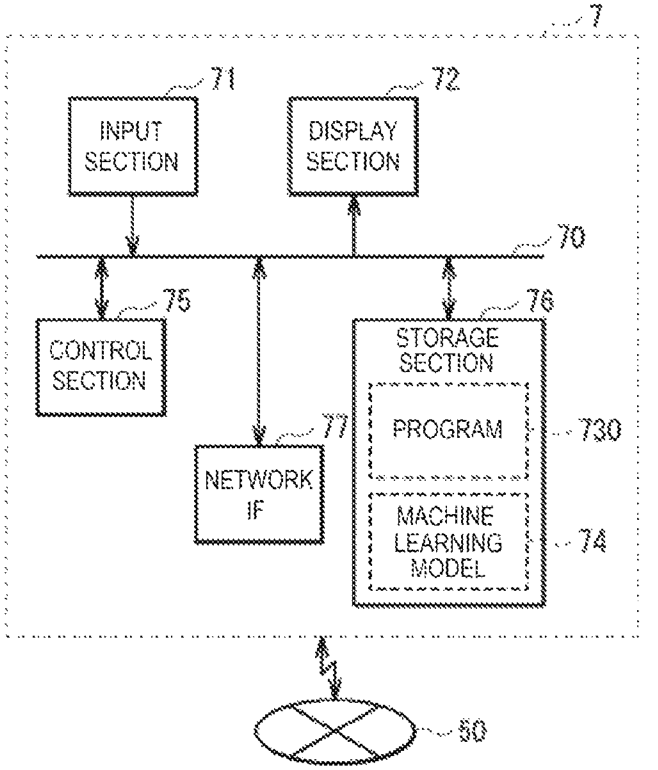
FIG. 4 is a physical block diagram showing a configuration example of an information processing device shown in FIG. 3.
Figure 5:
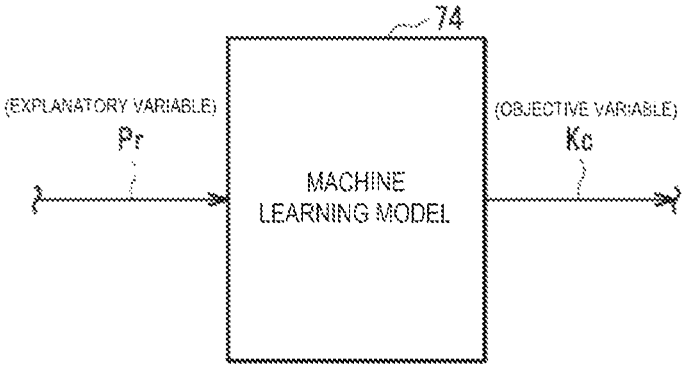
FIG. 5 is a block diagram showing a detailed configuration example of a machine learning model shown in FIG. 3 and FIG. 4.

FIG. 3 is a block diagram (a functional block diagram) showing the configuration example of the characteristic table generation system 5 according to the present embodiment, and FIG. 4 is a block diagram (a physical block diagram) showing a configuration example of the information processing device 7 (described later) shown in FIG. 3. Further, FIG. 5 is a block diagram showing a detailed configuration example of the machine learning model 74 shown in FIG. 3 and FIG. 4.

It should be noted that a method of generating a characteristic table according to the present embodiment is embodied in the characteristic table generation system 5 according to the present embodiment, and therefore will also be described. This point also applies to modified examples (Modified Examples 1 through 6) described later.

The characteristic table generation system 5 is a system for generating a predictive voltage characteristic table TPvp (a characteristic table defining a predictive characteristic curve CPvp between a voltage value Vp and an environmental temperature Ta described later, wherein the voltage value Vp represents a crest value of a pulse as the drive signal Sd based on a predetermined standard value described later). As shown in FIG. 3, the characteristic table generation system 5 is provided with the printer 1 having the inkjet heads 4, and the information processing device 7. Further, the printer 1 and the information processing device 7 are connected to each other via a network 50.

It should be noted that such a network 50 is, for example, a network which performs communication using a communications protocol (TCP/IP) normally used in the Internet. The network 50 can be, for example, a secure network which performs communication using a communication protocol unique to the network. Further, the network 50 is, for example, the Internet, an intranet, or a local area network. The connection between the network 50 and the printer 1, the information processing device 7 can be achieved by, for example, a wired LAN (Local Area Network) such as Ethernet (a registered trademark), a wireless LAN such as Wi-Fi (a registered trademark), or a mobile telephone line.

(Information Processing Device 7)

The information processing device 7 is a device located outside the printer 1, and is formed of, for example, a PC (Personal Computer). As shown in FIG. 3 (the functional block diagram), the information processing device 7 has an input section 71, a display section 72, an information processing section 73, and the machine learning model 74.

It should be noted that such an information processing device 7 corresponds to a specific example of an "external device" in the present disclosure.

The input section 71 is a section which receives an instruction from the outside (e.g., a user), and then outputs the instruction thus received to the information processing section 73. Such an input section 71 is formed of, for example, a keyboard and a mouse. Further, it is possible for the input section 71 to be formed of, for example, a touch panel disposed on (a display surface of) the display section 72 in the information processing device 7.

The display section 72 is a section which displays an image based on a video signal output from the information processing section 73. Such a display section 72 is configured using a display of a variety of types (e.g., a liquid crystal display, a CRT (Cathode Ray Tube) display, or an organic EL (Electro Luminescence) display).

The information processing section 73 is a section for performing a variety of types of information processing and so on, and has a data acquisition section 731, a conversion coefficient generation section 732, and a table generation section 733 as shown in FIG. 3. Further, as shown in FIG. 4 (the physical block diagram), such an information processing section 73 is configured using a control section 75, a storage section 76, and a network IF (Interface) 77. It should be noted that in the example shown in FIG. 4, the input section 71, the display section 72, the control section 75, the storage section 76, and the network IF 77 are coupled to each other via a bus 70.

As shown in FIG. 3, the data acquisition section 731 is a section which obtains the following data (input data) via the input section 71, the network 50, and so on described above. In other words, the data acquisition section 731 is arranged to obtain each of a measured viscosity characteristic table TMvi (a characteristic table defining a measured characteristic curve CMvi between the viscosity Vi of the ink 9 and the environmental temperature Ta) described later and predetermined parameters Pr described later as the input data.

As shown in FIG. 3, the conversion coefficient generation section 732 is a section for generating a conversion coefficient Kc in a predetermined conversion process (a conversion process from the measured characteristic curve CMvi described above into the predictive characteristic curve CPvp described above; see FIG. 10 and FIG. 11) described later using a predetermined analytical method (a first analytical method) based on the parameters Pr obtained by the data acquisition section 731. The predetermined analytical method means an analytical method taking the parameters Pr described above as explanatory variables, and at the same time, taking the conversion coefficient Kc described above as the objective variable. Further, as shown in FIG. 3 and FIG. 4, in the example of the present embodiment, the conversion coefficient generation section 732 is arranged to generate the conversion coefficient Kc based on the parameters Pr utilizing an analytical method using the machine learning model 74 hereinafter described.

As described above, such a machine learning model 74 is a predictive model obtained by performing the mechanical learning taking the parameters Pr as the explanatory variables and taking the conversion coefficient Kc as the objective variable. Further, as shown in FIG. 5, the machine learning model 74 is arranged to generate (predict) the conversion coefficient Kc (the objective variable) based on a learning result and then output the conversion coefficient Kc thus generated when the parameters Pr (the explanatory variables) are input.

It should be noted that as the analytical method (a prediction method) using such a machine learning model 74, there can be cited, for example, a support vector machine (SVM), a random forest (RF), and a multiple regression analysis.

As shown in FIG. 3, the table generation section 33 is a section which performs a predetermined conversion process described above using the measured viscosity characteristic table TMvi obtained by the data acquisition section 731 and the conversion coefficient Kc generated by the conversion coefficient generation section 732 to thereby generate the predictive voltage characteristic table TPvp. The predictive voltage characteristic table TPvp generated in such a manner is arranged to be supplied to a signal generation section 48 described later in the inkjet head 4 in the printer 1 via the network 50.

It should be noted that the details of processing in such an information processing section 73 (the data acquisition section 731, the conversion coefficient generation section 732, and the table generation section 733) will be described later.

The control section 75 shown in FIG. 4 is a section configured including a CPU (Central Processing Unit), a GPU (Graphics Processing Unit), and so on to execute, for example, a variety of programs stored in the storage section 76. Specifically, as shown in, for example, FIG. 4, the control section 75 is arranged to execute a program 730 stored in the storage section 76. The program 730 is a program for executing the processings in the information processing section 73 (the data acquisition section 731, the conversion coefficient generation section 732, and the table generation section 733) described above. Specifically, the program 730 is a program for making a computer (the control section 75) execute the functions in the information processing section 73 (the data acquisition section 731, the conversion coefficient generation section 732, and the table generation section 733).

The storage section 76 is a section for storing a variety of programs to be executed by the control section 75 and a variety of types of data. As shown in FIG. 4, the storage section 76 stores the program 730 described above as an example of such a variety of programs, and at the same time, stores the machine learning model 74 described above as an example of such a variety of types of data. Such a storage section 76 is configured using, for example, a RAM (Random Access Memory), a ROM (Read Only Memory), and an auxiliary storage device (a hard disk drive or the like).

As shown in FIG. 4, the network IF 77 is a communication interface for performing communication with the printer 1 via the network 50.

(Signal Generation Section 48)

Here, in the example shown in FIG. 3, the inkjet heads 4 each have the signal generation section 48 in addition to the nozzle plate 41, the actuator plate 42, and the drive section 49 described above.

The signal generation section 48 is a section for generating the drive signal Sd having one pulse (having a pulse width Wp and a voltage value Vp representing a crest value) or a plurality of pulses using the predictive voltage characteristic table TPvp generated by the table generation section 733 in the information processing device 7 in such a manner as described above.

Here, FIG. 6A through FIG. 6C are each a timing chart schematically showing a configuration example of such a drive signal Sd. It should be noted that in FIG. 6A through FIG. 6C, the horizontal axis represents time t, and the vertical axis represents a drive voltage Vd (a positive voltage in this example) in the drive signal Sd, respectively.

First, the drive signal Sd shown in FIG. 6A has a single pulse (a pulse Pa) and corresponds to an example of a case of a so-called "one drop." The pulse Pa represents an ON period disposed between a rising timing and a falling timing, and has a pulse width Wpa1 and a voltage value Vp1 as an example of the pulse width Wp and the voltage value Vp described above.

In contrast, the drive signal Sd shown in FIG. 6B has the following two pulses (pulses Pa, Pb) as the pulses to which a so-called "multi-pass method" is applied (an example of a case of a so-called "two drops"). That is, as such pulses (the ON periods), there are disposed the two pulses, namely the pulses Pa, Pb. It should be noted that an OFF period ("OFF") is disposed between these two pulses Pa, Pb. Further, as an example of the pulse width Wp and the voltage value Vp described above, the pulse Pa has a pulse width Wpa2 and a voltage value Vp2, and the pulse Pb has a pulse width Wpb2 and the voltage value Vp2.

Similarly, the drive signal Sd shown in FIG. 6C has the following three pulses (pulses Pa, Pb, and Pc) as the pulses to which the "multi-pass method" described above is applied (an example of a case of a so-called "three drops"). That is, as such pulses (the ON periods), there are disposed the three pulses, namely the pulses Pa, Pb, and Pc. It should be noted that an OFF period ("OFF1") is disposed between the pulses Pa, Pb, and at the same time, an OFF period ("OFF2") is disposed between the pulses Pb, Pc. Further, as an example of the pulse width Wp and the voltage value Vp described above, the pulse Pa has a pulse width Wpa3 and a voltage value Vp3, the pulse Pb has a pulse width Wpb3 and the voltage value Vp3, and the pulse Pc has a pulse width Wpc3 and the voltage value Vp3.

It should be noted that each of the pulses Pa, Pb, and Pc in these drive signals Sd forms a positive pulse which expands the ejection channel described above in a period of a high (High) state, and contracts the ejection channel in a period of a low (Low) state.

Here, the signal generation section 48 sets each of the pulse width Wp and the voltage value Vp in such pulses (the pulses Pa, Pb, and Pc) to generate the drive signal Sd using the pulse width Wp and the voltage value Vp thus set although described later in detail. Specifically, the signal generation section 48 is arranged to obtain the voltage value Vp of the pulse using the predictive voltage characteristic table TPvp described above, and at the same time, generate the drive signal Sd using the pulse having the voltage value Vp thus obtained.

Here, the voltage value Vp described above corresponds to a specific example of the "crest value" in the present disclosure. Further, the "pulse" described above is in a concept including not only such rectangular waves as shown in FIG. 6A through FIG. 6C, but also waveforms such as a trapezoidal wave, a triangular wave, or a stepped wave, which applies to the following.

[Operations and Functions/Advantages]

(A. Basic Operation of Printer 1)

In the printer 1, a recording operation (a printing operation) of images, characters, and so on to the recording paper P is performed in the following manner. It should be noted that as an initial state, it is assumed that the four types of ink tanks 3 (3Y, 3M, 3C, and 3K) shown in FIG. 1 are sufficiently filled with the ink 9 of the corresponding colors (the four colors), respectively. Further, there is achieved the state in which the inkjet heads 4 are filled with the ink 9 in the ink tanks 3 via the ink supply tubes 30, respectively.

In such an initial state, when operating the printer 1, the grit rollers 21 in the carrying mechanisms 2*a*, 2*b* each rotate to thereby carry the recording paper P along the carrying direction d (the X-axis direction) between the grit rollers 21 and the pinch rollers 22. Further, at the same time as such a carrying operation, the drive motor 633 in the drive mechanism 63 rotates each of the pulleys 631*a*, 631*b* to thereby operate the endless belt 632. Thus, the carriage 62 reciprocates along the width direction (the Y-axis direction) of the recording paper P while being guided by the guide rails 61*a*, 61*b*. Then, on this occasion, the four colors of ink 9 are appropriately ejected on the recording paper P by the respective inkjet heads 4 (4Y, 4M, 4C, and 4K) to thereby perform the recording operation of images, characters, and so on to the recording paper P.

(B. Detailed Operation in Inkjet Head 4)

Then, the detailed operation (a jet operation of the ink 9) in the inkjet head 4 will be described. Specifically, in this inkjet head 4, the jet operation of the ink 9 using a shear mode is performed in the following manner.

First, the drive section 49 applies (see FIG. 2 and FIG. 3) the drive voltages Vd (the drive signals Sd) to the drive electrodes (the common electrodes and the active electrodes) described above in the actuator plate 42. Specifically, the drive section 49 applies the drive voltage Vd to the drive electrodes disposed on the pair of drive walls partitioning the ejection channel described above. Thus, the pair of drive walls each deform so as to protrude toward the dummy channel adjacent to the ejection channel.

On this occasion, it results in that the drive wall makes a flexion deformation to have a V shape centering on the intermediate position in the depth direction in the drive wall. Further, due to such a flexion deformation of the drive wall, the ejection channel deforms as if the ejection channel bulges. As described above, due to the flexion deformation caused by a piezoelectric thickness-shear effect in the pair of drive walls, the volume of the ejection channel increases. Further, by the volume of the ejection channel increasing, the ink 9 is induced into the ejection channel as a result.

Subsequently, the ink 9 having been induced into the ejection channel in such a manner turns to a pressure wave to propagate to the inside of the ejection channel. Then, the drive voltage Vd to be applied to the drive electrodes becomes 0 (zero) V at the timing at which the pressure wave has reached the nozzle hole Hn of the nozzle plate 41 (or timing in the vicinity of that timing). Thus, the drive walls are restored from the state of the flexion deformation described above, and as a result, the volume of the ejection channel having once increased is restored again.

In such a manner, the pressure in the ejection channel increases in the process that the volume of the ejection channel is restored, and thus, the ink 9 in the ejection channel is pressurized. As a result, the ink 9 having a droplet shape is ejected (see FIG. 2 and FIG. 3) toward the outside (toward the recording paper P) through the nozzle hole Hn. The jet operation (the ejection operation) of the ink 9 in the inkjet head 4 is performed in such a manner, and as a result, the recording operation (the printing operation) of images, characters, and so on to the recording paper P is performed.

(C. Operation of Generating Characteristic Table, etc.)

Figure 8:
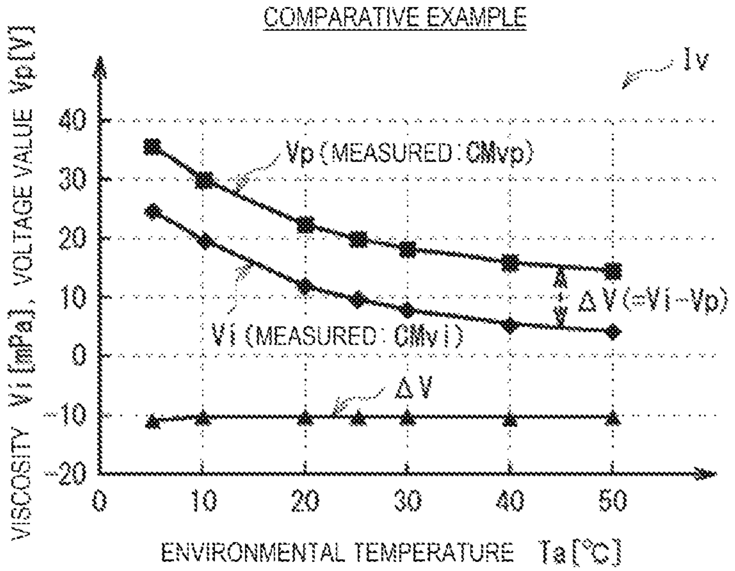
FIG. 8 is a diagram showing an example of viscosity information related to the comparative example.
Figure 9:
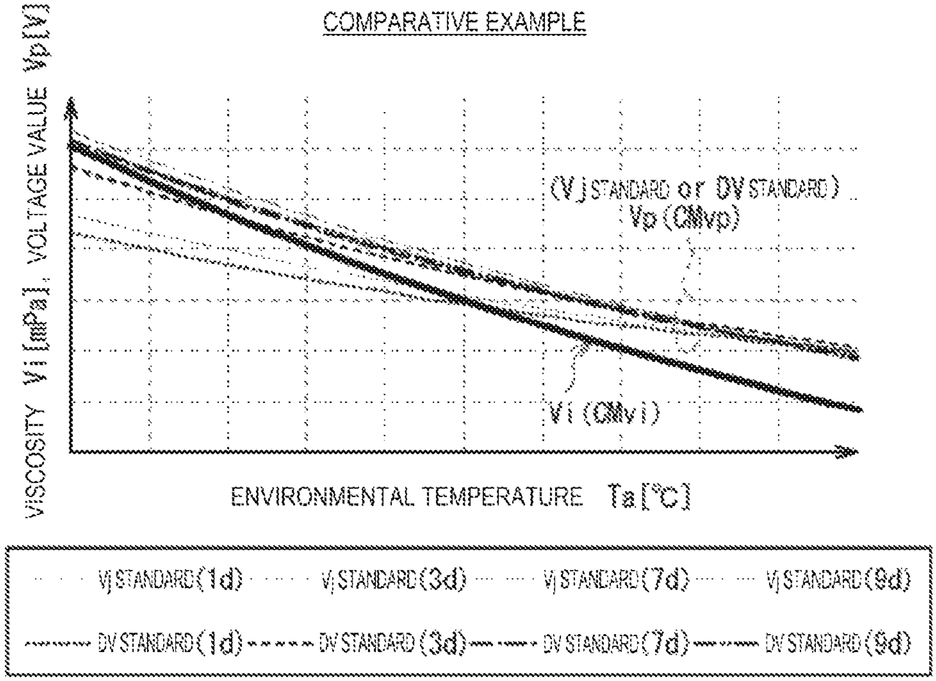
FIG. 9 is a diagram showing an example of a variety of characteristic curves related to the comparative example.

Then, an operation of generating the characteristic table (the predictive voltage characteristic table TPvp described above) (a generation process) and so on in the characteristic table generation system 5 will be described in detail with reference to FIG. 7 through FIG. 17 in addition to FIG. 1 through FIG. 6C while comparing to a comparative example (FIG. 7 through FIG. 9).

(C-1. Comparative Example)

FIG. 7 is a block diagram showing a schematic configuration example of a printer 101 as a liquid jet recording device according to the comparative example. The printer 101 in the comparative example is provided with the nozzle plate 41, the actuator plate 42, the signal generation section 48, and the drive section 49 described above in the inkjet head or the like in the comparative example not shown.

It should be noted that in the printer 101 of the comparative example, unlike the printer 1 in the embodiment, the signal generation section 48 is arranged to set the voltage value Vp using viscosity information Iv described hereinafter instead of the predictive voltage characteristic table TPvp described above.

FIG. 8 shows an example of the viscosity information Iv related to such a comparative example. Specifically, in FIG. 8, there is shown an example of a correspondence relationship (information including the viscosity information Iv) between the environmental temperature Ta and the viscosity Vi (measured values) of the ink 9, between the environmental temperature Ta and the voltage value Vp (measured values) in the pulse of the drive signal Sd, and between the environmental temperature Ta and a difference value ΔV (=Vi−Vp) between the viscosity Vi and the voltage value Vp. In other words, in the example shown in FIG. 8, there are shown a characteristic curve (a measured characteristic curve CMvi) between the viscosity Vi (measured values) and the environmental temperature Ta, a characteristic curve (a measured characteristic curve CMvp) between the voltage value Vp (measured values) and the environmental temperature Ta, and a characteristic curve between the difference value ΔV and the environmental temperature Ta.

It should be noted that the environmental temperature Ta described above corresponds to a specific example of the "temperature" in the present disclosure.

Incidentally, the "viscosity Vi of the ink 9" mentioned here means static viscosity, which applies to the following. Further, such viscosity Vi of the ink 9 is arranged to be measured using, for example, a rotary viscometer, a vibratory viscometer, or a viscometer (a viscometer capable of measuring static viscosity) of other measuring methods such as a canalicular type or a falling-ball type.

First, in the comparative example, it is arranged that such viscosity information Iv as shown in FIG. 8 can be obtained by detecting (performing the measurement at a plurality of points such as no less than 5 points) a change in viscosity Vi of the ink 9 with respect to a change in the environmental temperature Ta. Further, it has been known that the change in the viscosity Vi of the ink 9 with respect to the environmental temperature Ta and the change in the voltage value Vp (the voltage value Vp with which a standard ejection speed can be obtained) with respect to the environmental temperature Ta show respective variation characteristics similar to each other as shown in, for example, FIG. 8. Therefore, the difference value ΔV between the viscosity Vi and the voltage value Vp is arranged to show a substantially constant value without depending on the environmental temperature Ta as shown in, for example, FIG. 8.

Further, as shown in FIG. 7, the signal generation section 48 in the comparative example subtracts the difference value ΔV (a negative value) calculated in advance from a value of the viscosity Vi (see the viscosity information Iv) at a certain environmental temperature Ta to thereby obtain the voltage value Vp with which the standard ejection speed can be obtained using such similarity in variation characteristic with temperature. In other words, the signal generation section 48 in the comparative example uses the relational expression (see FIG. 8) of Vp=(Vi−ΔV) to thereby obtain the voltage value Vp at a certain environmental temperature Ta.

Incidentally, the characteristic curve (the measured characteristic curve CMvp described above) between the voltage value Vp and the environmental temperature Ta generally becomes a curve having the gradient differing in accordance with a type of the number of pulses included in the drive signal Sd, a class or a role of each of the pulses (a class and a role of each of the pulses including an additional pulse such as an auxiliary pulse), and so on. Therefore, in the comparative example, it is necessary to obtain such a measured characteristic curve CMvp by basically performing a manual measurement in advance. It should be noted that it is possible to derive such a measured characteristic curve CMvp without performing the actual measurement in a limited condition (e.g., the case of "one drop" described above based on the ejection speed).

It is necessary to obtain the measured characteristic curve CMvp described above in such a manner by performing the actual measurement, for example, for each of the types of the number of pulses included in the drive signal Sd. Therefore, an immense amount time and trouble is required for the user of the printer 101 in the comparative example, and the work burden and the operation cost increase as a result.

Here, FIG. 9 shows an example of a variety of characteristic curves (the measured characteristic curve CMvp and the measured characteristic curve CMvi) related to the comparative example. Specifically, in the measured characteristic curves CMvp shown in FIG. 9, there are shown the cases in which the number of pulses described above (the number of drops described above) is one (described as "1d"), three (described as "3d"), seven (described as "7d"), and nine (described as "9d"), respectively. Further, in each of the measured characteristic curves CMvp shown in FIG. 9, there is shown the voltage value Vp based on a predetermined standard value. In other words, in the measured characteristic curves CMvp shown in FIG. 9, there are shown the voltage value Vp (described as "Vj standard") with which the standard ejection speed can be obtained when the ink 9 is jetted, and the voltage value Vp (described as "DV standard") with which a standard drop volume (DV) of the ink 9 can be obtained when the ink 9 is jetted. It should be noted that the drive waveforms when obtaining the variety of characteristic curves shown in FIG. 9 include the case of "common drive" described later with respect to all of the conditions (the number of drops).

In the example shown in FIG. 9, as described above, the gradient and so on of the measured characteristic curve CMvp differ in accordance with the type of the number of pulses (the number of drops) and the type (the Vj standard or the DV standard) of the predetermined standard value described above. Therefore, when arranging that the single measured characteristic curve CMvp is used in two or more cases when generating the drive signal Sd as in the case of the viscosity information Iv in the comparative example shown in, for example, FIG. 8, the setting accuracy of the voltage value Vp degrades as a result due to a difference in gradient corresponding to the type of the number of pulses, the type of the predetermined standard value, the class, the role, and so on of the pulses described above. Therefore, it becomes difficult to accurately set the voltage value Vp (the crest value) of the pulse in the drive signal Sd.

Specifically, in the comparative example, a single voltage characteristic table (the case of "one drop" based on the ejection speed and so on as described above) can only be generated based on, for example, the measured characteristic curve CMvi as a result. Further, as described above, in order to obtain the measured characteristic curves CMvp of the respective conditions (for the types of the number of pulses and so on), the immense amount of trouble is required for the measurement. With all these factors, in the method of the comparative example, there is a possibility that the convenience of the user is impaired due to the degradation of the setting accuracy of the voltage value Vp described above, the increase in work burden of the user, and so on.

(C-2. Present Embodiment)

Therefore, in the present embodiment, it is arranged that in the information processing section 73 (the program 730) described above, the conversion coefficient Kc used in the conversion process described hereinafter is generated using the predetermined analytical method described above, and then the characteristic table (the predictive voltage characteristic table TPvp for defining the predictive characteristic curve CPvp) described above is generated as needed (generated automatically) using the conversion coefficient Kc.

Figure 10:
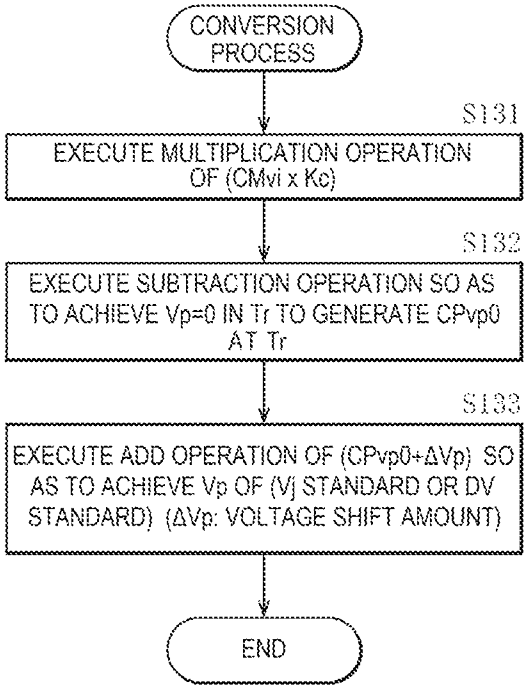
FIG. 10 is a flowchart showing an example of a conversion process related to the embodiment.
Figure 11:
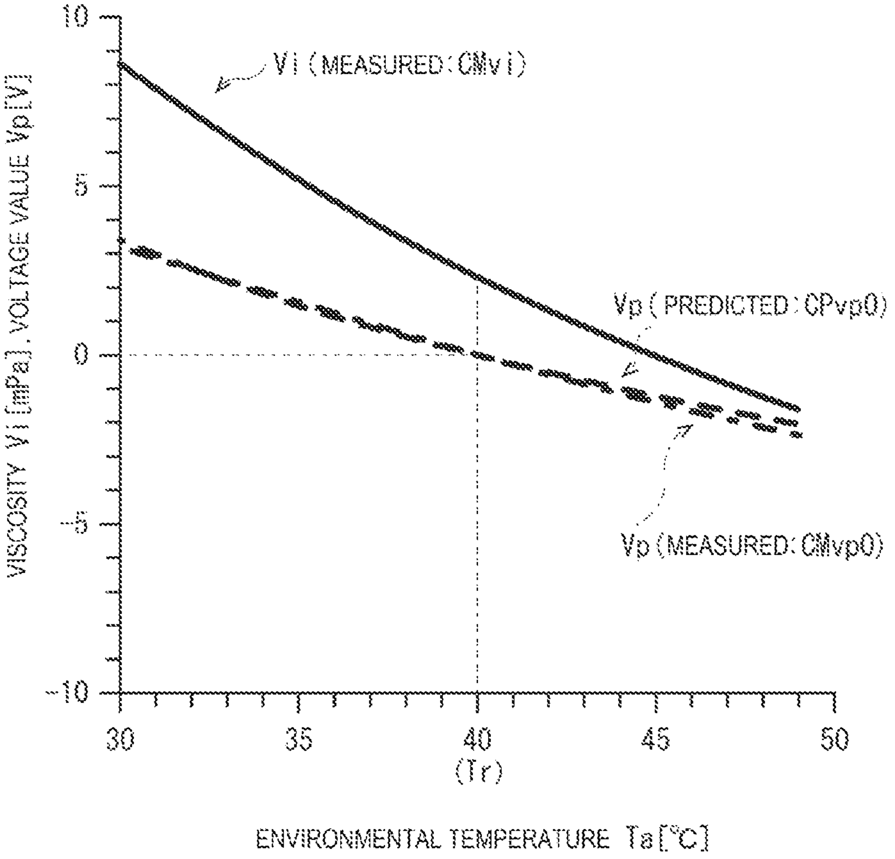
FIG. 11 is a diagram showing an example of a variety of characteristic curves related to the embodiment.
Figure 13:
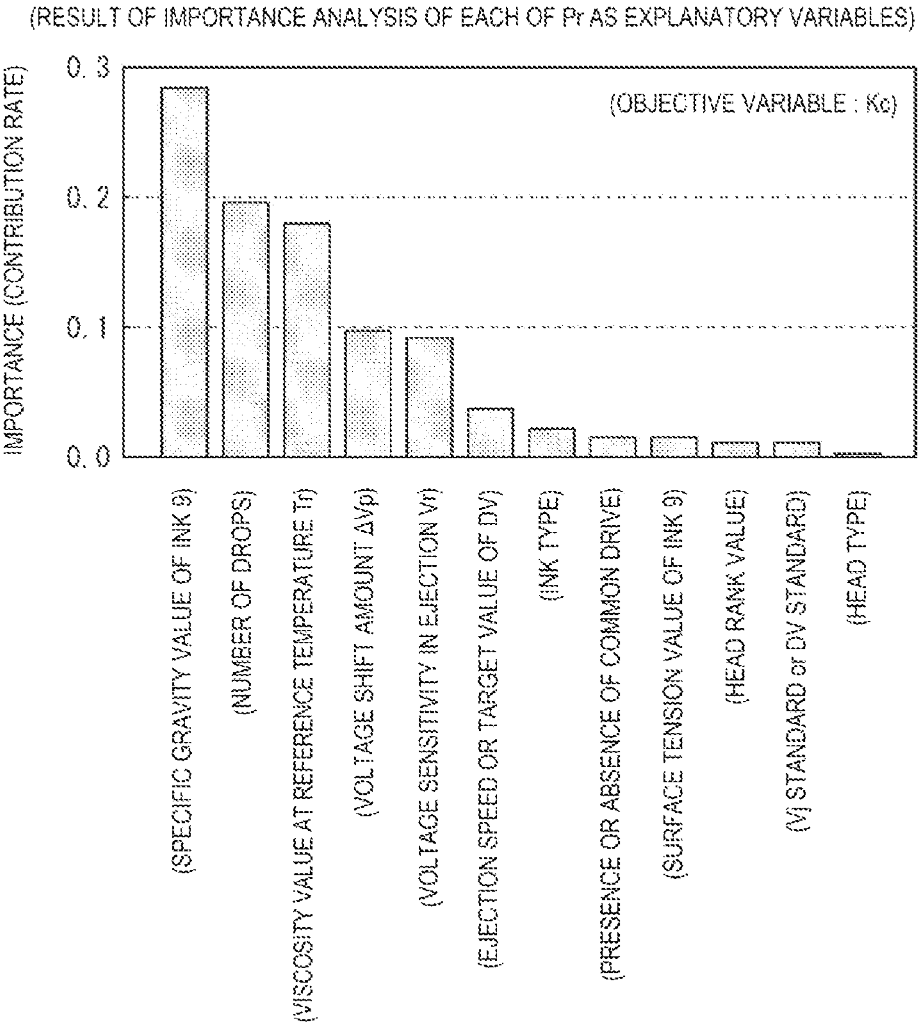
FIG. 13 is a diagram showing an example of a result of an importance analysis of the parameters shown in FIG. 12.

Here, FIG. 10 is a flowchart showing an example (corresponding to a specific example of processing in the step S13 shown in FIG. 14 described later) of the conversion process described later according to the present embodiment. Further, FIG. 11 shows an example of a variety of characteristic curves (characteristic curves after executing the step S132 described later shown in FIG. 10) related to the present embodiment. Specifically, FIG. 11 shows an example of a variety of characteristic curves (the measured characteristic curve CMvi, a preliminary characteristic curve CPvp0 of the predictive characteristic curve CPvp described above, and so on) representing a correspondence relationship between the viscosity Vi [mPa] of the ink 9 or the voltage value Vp, and the environmental temperature Ta [° C]. It should be noted that a preliminary characteristic curve CMvp0 shown in FIG. 11 for the sake of convenience forms a characteristic curve obtained by performing predetermined processing (processing for achieving the voltage value Vp=0 at a predetermined reference temperature Tr described later) on the measured characteristic curve CMvp so as to easily be compared (in gradient) with the preliminary characteristic curve CPvp0. Further, FIG. 12 shows an example of the predetermined parameters Pr related to the present embodiment, and FIG. 13 shows an example of a result of an importance analysis of the parameters Pr shown in FIG. 12. It should be noted that in FIG. 12, the values of the parameters Pr are shown with respect to six samples ("sample 1" through "sample 6"). Further, the importance in the result of the importance analysis shown in FIG. 13 means an index (a contribution rate) of the contribution of the division of the feature amount thereof to the classification of the target, and is arranged to be calculated using a predetermined calculating formula based on so-called Gini impurity.

(Regarding Conversion Process)

First, as shown in, for example, FIG. 10 and FIG. 11, in the present embodiment, the conversion process using the conversion coefficient Kc described above means a process of converting the measured characteristic curve CMvi (the characteristic curve between the measured value of the viscosity Vi and the environmental temperature Ta) into the predictive characteristic curve CPvp (the characteristic curve between the predicted value of the voltage value Vp and the environmental temperature Ta). Further, as shown in the example in FIG. 11, it is understood that the preliminary characteristic curve CPvp0 obtained in such a conversion process coincides with accuracy (substantially coincides) with the preliminary characteristic curve CMvp0 with respect to the measured characteristic curve CMvp (the characteristic curve between the measured value of the voltage value Vp and the environmental temperature Ta) described above.

Here, a specific example such a conversion process (a conversion process from the measured characteristic curve CMvi into the predictive characteristic curve CPvp) will be described with reference to FIG. 10 and FIG. 11.

In this conversion process, first, a multiplication operation (CMvixKc) of multiplying the measured characteristic curve CMvi by the conversion coefficient Kc is performed (step 5131 shown in FIG. 10). Then, the preliminary characteristic curve CPvp0 (the preliminary characteristic curve between the predicted value of the voltage value Vp and the environmental temperature Ta) described above is generated (step S132) by performing a subtraction operation on the result of the multiplication operation in the step S131 so that the voltage value Vp=0 is achieved at the predetermined reference temperature Tr (Tr=40° C. in the example shown in FIG. 11). In other words, due to such preliminary processes (the processes in the steps S131, S132), such a preliminary characteristic curve CPvp0 as shown in, for example, FIG. 11 is generated as a result from the measured characteristic curve CMvi using the conversion coefficient Kc. It should be noted that the execution sequence of the processes in the steps S131, S132 when executing such preliminary processes can be, for example, an opposite execution sequence (a sequence in which the step S132 is executed first, and then the step S131 is executed) to that in the example shown in FIG. 10.

Subsequently, an add operation (CPvp0+ΔVp) of adding a predetermined voltage shift amount ΔVp to the voltage value Vp in the preliminary characteristic curve CPvp0 is performed so as to achieve the voltage value Vp in (the Vj standard or the DV standard) described above with reference to FIG. 9 to generate (step S133) the determinate predictive characteristic curve CPvp. In other words, such a voltage value Vp (the voltage value Vp in the predictive characteristic curve CPvp) after adding the voltage shift amount ΔVp corresponds to the voltage value Vp with which the standard ejection speed can be obtained, or the voltage value Vp with which the standard drop volume of the ink 9 can be obtained when the ink 9 is jetted. In such a manner, the determinate predictive characteristic curve CPvp is generated, and the sequence of conversion process shown in FIG. 10 is terminated.

Incidentally, the specific conversion equation when performing such a conversion process is expressed as the following formula (1) using the conversion coefficient Kc described above.

$$H=(H0\times e(E/kT))/Kc \qquad (1)$$

H: a value obtained by performing the conversion process on the viscosity value of the ink 9

H0: a constant

T: absolute temperature (the environmental temperature Ta)

E: activation energy k: Boltzmann constant

It should be noted that the formula obtained by removing the conversion coefficient Kc from the formula (1) described above is called Arrhenius equation (law), and is well known to the public. Further, the reason that the Arrhenius equation is divided by the conversion coefficient Kc in the formula (1) is that the calculation using (the viscosity value of the ink 9)/(the measured value of the voltage value Vp) is performed when performing the analytical method using the machine learning model 74. Therefore, for example, when performing the calculation conversely using (the measured value of the voltage value Vp)/(the viscosity value of the ink 9) in the analytical method using the machine learning model 74, a formula of multiplying the Arrhenius equation described above by the conversion coefficient Kc becomes the conversion equation when performing the conversion process described above. In other words, it can be said that either of these can be used as the conversion equation when performing the conversion process.

(Regarding Predetermined Parameters Pr)

Here, as the predetermined parameters Pr described above, there can be cited those listed in (a) through (l) below as an example as shown in FIG. 12:

(a) the number of drops (the number of pulses)—corresponding to the number of pulses included in a unit period in the drive signal Sd described above with reference to FIG. 6A through FIG. 6C;

(b) presence or absence of the common drive ("0": absence, "1": presence, "2": a special value)—a so-called common drive (a drive method of setting the pulse of the drive signal Sd so as to include a change in which the volume of the ejection channel is contracted from a standard value when ejecting the ink 9);

(c) a head type—a symbol or the like representing a type of the inkjet heads 4;

(d) an ink type—a type of the ink 9 classified in accordance with a principal solvent of the ink 9 ("Oil": the ink 9 with an oil solvent, "sol": the ink 9 with an organic solvent, "UV": UV (ultraviolet) curable ink, and "WB": the Water Base (with water as the principal solvent) ink 9);

(e) (the Vj standard or the DV standard)—a parameter representing which one of the standards (the Vj standard and the DV standard) described above with reference to FIG. 9 is applied;

(f) a head rank value—a value (unit: [V]) which is inherent in the inkjet head 4, and corresponds to the voltage value Vp with which a predetermined ejection speed is achieved when a predetermined test liquid is jetted from the inkjet head 4;

(g) a viscosity value at the reference temperature Tr—a viscosity value (unit: [mPa]) of the ink 9 at the reference temperature Tr when using the ink 9 while heated;

(h) voltage sensitivity Vr (the Vj standard or the DV standard) when performing ejection—a value (unit: [m/s/V] or [pl/V]) corresponding to a variation per unit voltage in the ejection speed or the drop volume of the ink 9 when the ink 9 is jetted at the reference temperature Tr described above;

(i) a surface tension value of the ink 9 (unit: [mN/m]);

(j) a specific gravity value of the ink 9 (or a physical property value (e.g., a density of the ink 9 or a sound speed in the ink 9) which can be obtained using the specific gravity value of the ink 9);

(k) the voltage shift amount ΔVp; (1) a target value of the ejection speed or the DV (drop volume) of the ink 9.

Further, according to an example of the result of the importance analysis of the parameters Pr as the explanatory variables shown in FIG. 13, those become relatively high in importance (contribution rate) described above when generating the conversion coefficient Kc using the machine learning model 74 are as follows out of the parameters Pr listed in (a) through (l) described above. That is, in the example shown in FIG. 13, such importance is relatively high in the order of (j) the specific gravity value (or the physical property value described above) of the ink 9, (a) the number of drops, (g) the viscosity value at the reference temperature Tr, (k) the voltage shift amount ΔVp, (h) the voltage sensitivity Vr when performing ejection, (l) the target value of the ejection speed or the DV of the ink 9, (d) the ink type, (b) presence or absence of the common drive, (i) the surface tension value of the ink 9, (f) the head rank value, (e) (the Vj standard or the DV standard), and (c) the head type.

Therefore, in the present embodiment, it is desirable that (j) the specific gravity value (or the physical property value described above) of the ink 9 which is the highest in importance of all is at least included in the predetermined parameters Pr described above. Further, it can be said that it is desirable that at least one of the parameters relatively high in importance (the second through fifth highest in importance, as an example) out of the rest of the parameters shown in FIG. 13, namely (a) the number of drops, (g) the viscosity value at the reference temperature Tr, (k) the voltage shift amount ΔVp, and (h) the voltage sensitivity Vr when performing ejection, is further included in the predetermined parameters Pr described above.

(Regarding Details of Generation Process of Characteristic Table, etc.)

Figure 14:
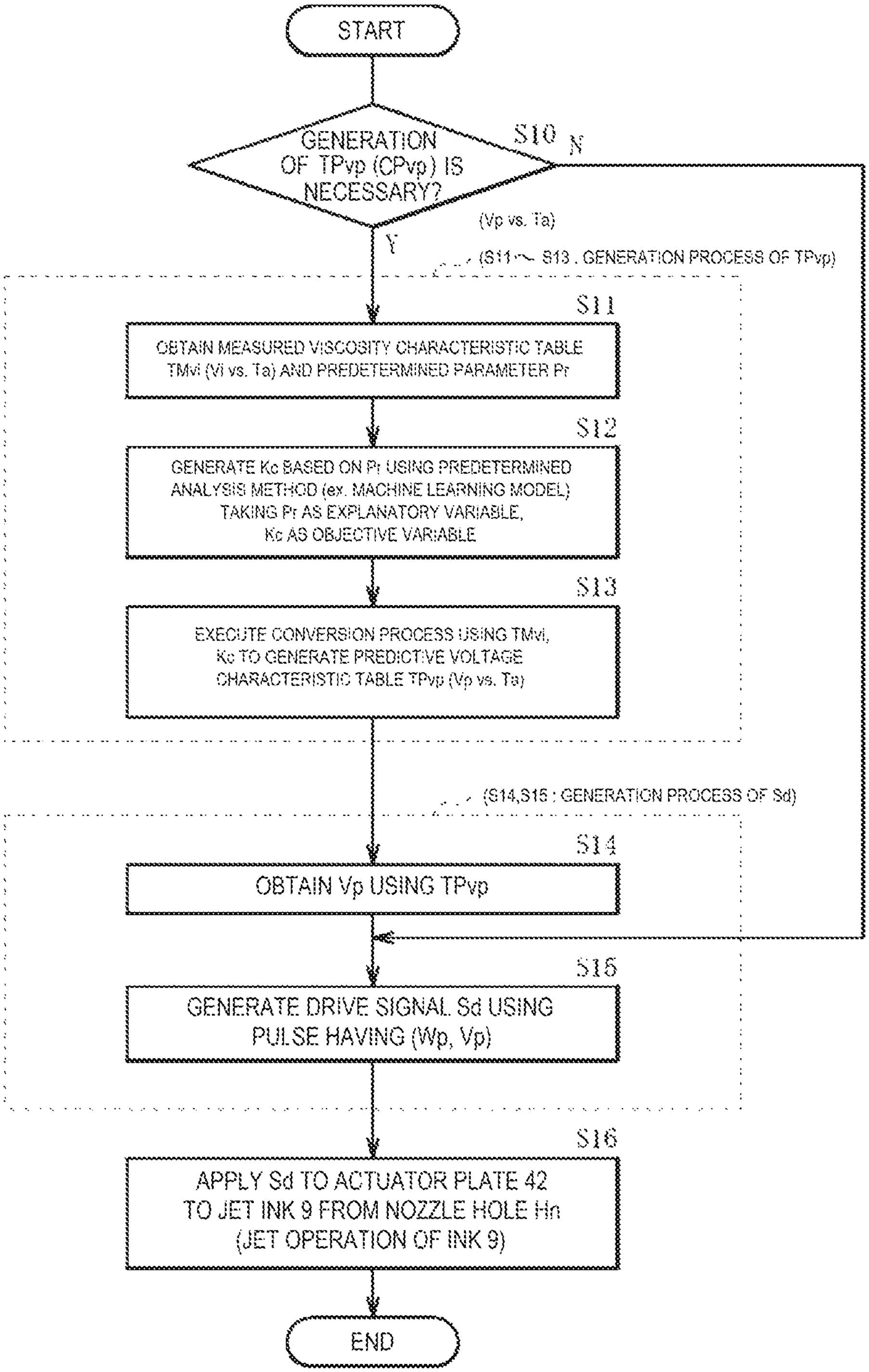
FIG. 14 is a flowchart showing a generation process and so on of a characteristic table related to the embodiment.

Here, FIG. 14 is a flowchart showing the generation process of the characteristic table (the predictive voltage characteristic table TPvp) related to the present embodiment and so on. It should be noted that out of a series of processes (steps S10 through S16 described later) shown in FIG. 14, the processes in the steps S11 through S13 described later correspond to the generation process of the predictive voltage characteristic table TPvp, and the processes in the steps S14, S15 described later correspond to the generation process of the drive signal Sd.

In the series of processes shown in FIG. 14, the information processing section 73 (the program 730) first makes (step S10) a judgment on whether or not it is necessary to generate (update) the predictive voltage characteristic table TPvp which defines the predictive characteristic curve CPvp described above as a preliminary step. Here, when it has been judged that it is necessary to generate the predictive voltage characteristic table TPvp (Y in the step S10), there is made the transition to the generation process of the predictive voltage characteristic table TPvp (steps S11 through S13) described hereinafter. In contrast, when it has been judged that it is unnecessary to generate the predictive voltage characteristic table TPvp (N in the step S10), the transition to the step S15 described later is made, and the generation operation of the drive signal Sd is performed using the pulse having the voltage value Vp (the crest value) in the present stage as a result.

It should be noted that as an example of the case in which it is necessary to generate the predictive voltage characteristic table TPvp, there can be cited, for example, the following cases. That is, there can be cited when a predetermined time has elapsed, when a predetermined operation signal from the user has been input to the printer 1, when a non-ejection period (an idle period) of the ink 9 has become longer than a predetermined time, and so on. Further, there can also be cited, for example, when a color, a type, or the like of the ink 9 in the ink tank has been changed, and when the inkjet head 4 of a different model has been installed in the printer 1. Further, there can also be cited, for example, when at least one of such parameters Pr as shown in FIG. 12 has been changed.

(Steps S11 Through S13: Generation Process of Predictive Voltage Characteristic Table TPvp)

Subsequently, in the generation process (steps S11 through S13) of the predictive voltage characteristic table TPvp, first, the data acquisition section 371 obtains the following data (the input data). Specifically, the data acquisition section 731 obtains (step S11) each of the measured viscosity characteristic table TMvi defining the measured characteristic curve CMvi between the viscosity Vi of the ink 9 and the environmental temperature Ta and the predetermined parameters Pr described above as the input data using the method described above.

Then, the conversion coefficient generation section 732 generates (step S12) the conversion coefficient Kc based on the parameters Pr using the predetermined analytical method (the first analytical method) taking the parameters Pr obtained in the step S11 as the explanatory variables, and taking the conversion coefficient Kc described above as the objective variable. Specifically, in the example of the present embodiment, the conversion coefficient generation section 732 generates the conversion coefficient Kc based on the parameters Pr utilizing an analytical method using the machine learning model 74 described above.

Then, the table generation section 733 performs the predetermined conversion process (see FIG. 10, FIG. 11) described above using the measured viscosity characteristic table TMvi obtained in the step S11 and the conversion coefficient Kc generated in the step S12 to thereby generate (step S13) the predictive voltage characteristic table TPvp. In such a manner, as described above, there is generated the predictive voltage characteristic table TPvp which defines the predictive characteristic curve CPvp between the voltage value Vp (the crest value) of the pulse of the drive signal Sd and the environmental temperature Ta.

(Steps S14, S15: Generation Process of Drive Signal Sd)

Subsequently, in the generation process of the drive signal Sd (steps S14, S15), first, the signal generation section 48 obtains (step S14) the voltage value Vp (the crest value) in the pulse of the drive signal Sd with the method (see FIG. 6A through FIG. 6C) described above using the predictive voltage characteristic table TPvp generated in the step S13. Specifically, it is arranged that the voltage value Vp of the pulse can be obtained by applying the current environmental temperature Ta to the predictive voltage characteristic table TPvp.

Then, the signal generation section 48 generates (step S15) such a drive signal Sd as shown in FIG. 6A through FIG. 6C described above using the pulse having the voltage value Vp obtained in the step S14 and, for example, the pulse width Wp set in advance.

Incidentally, it is arranged that the pulse width Wp described above can be obtained based on, for example, an on-pulse peak (AP) in the pulse. The AP corresponds to a period (1 AP=(characteristic vibration period of the ink 9)/2) half as large as the characteristic vibration period of the ink 9 in the ejection channel described above. Further, when the pulse width Wp is set to the AP, the jetting speed (the ejection efficiency) of the ink 9 is maximized when ejecting (making one droplet ejection of) the ink 9 as much as one normal droplet. Further, the AP is arranged to be defined by, for example, the shape of the ejection channel and a physical property value (the specific gravity or the like) of the ink 9.

Further, it is arranged that the pulse width Wp is set in, for example, the following manner based on such an AP. That is, in the case of the example of drive signal Sd shown in, for example, FIG. 6A through FIG. 6C described above (the example of the cases of so-called "one drop," "two drops," and "three drops," respectively), the signal generation section 48 sets the pulse widths Wp in the following manner. That is, in the example of FIG. 6A through FIG. 6C, the signal generation section 48 sets the pulse widths Wp so that, for example, the pulse widths Wp described above fulfill the relationships represented by the formula (2) and the formula (3) described below with the AP. It should be noted that the example represented by the formula (2) and the formula (3) is not a limitation, and it is possible to arbitrarily set the pulse widths Wp.

$$(1.25\times AP)\leq(Wpa1, Wpa2, Wpa3, Wpb2, Wpb3, Wpc3)\leq(1.75\times AP) \quad (2)$$

$$(Wpa1)\geq(Wpa2, Wpb2)\geq(Wpa3, Wpb3, Wpc3) \quad (3)$$

(Step S16: Jet Operation of Ink 9)

Subsequently, the drive section 49 applies the drive signal Sd generated in the step S15 to the actuator plate 42 described above in the inkjet head 4 to jet (step S16) the ink 9 from the nozzle holes Hn. In such a manner, the jet operation of the ink 9 described above is performed.

This terminates the series of the processes shown in FIG. 14.

(C-3. Example of Prediction Result by Machine Learning)

Figure 17A:
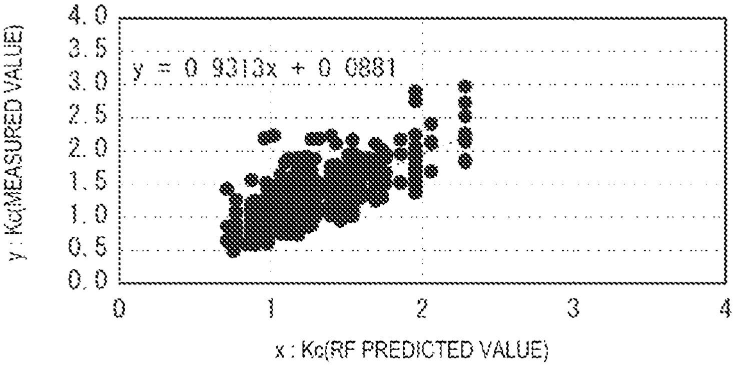
FIG. 17A is a diagram showing an example of a correspondence relationship between the RF predicted value and the measured value when using only some of the parameters shown in FIG. 13.
Figure 17B:
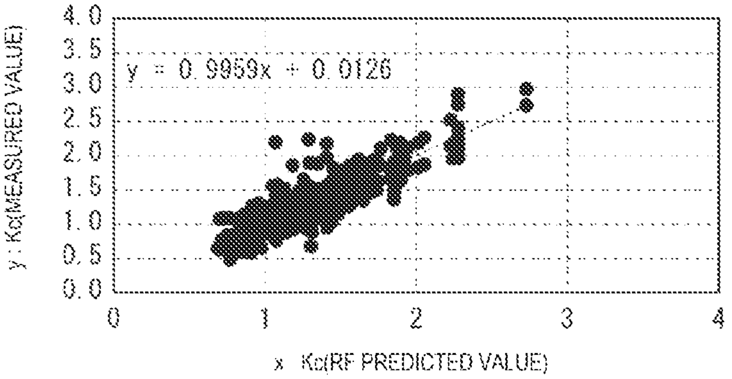
FIG. 17B is a diagram showing an example of a correspondence relationship between the RF predicted value and the measured value when using only some of the parameters shown in FIG. 13.
Figure 17C:
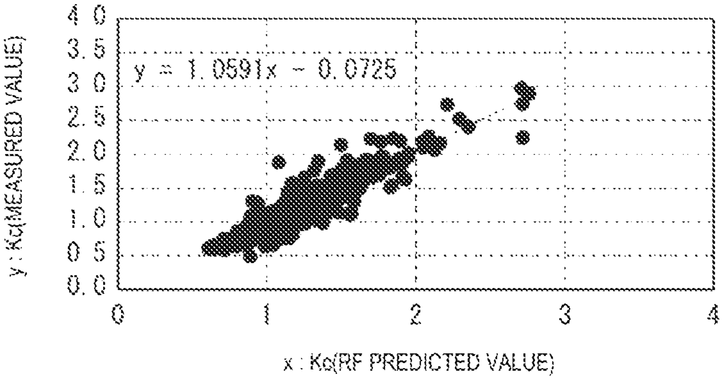
FIG. 17C is a diagram showing an example of a correspondence relationship between the RF predicted value and the measured value when using only some of the parameters shown in FIG. 13.

Here, FIG. 15 is a diagram showing an example of predicted values by the machine learning and a measured value related to the present embodiment. Further, FIG. 16A is a diagram showing an example of a correspondence relationship between the SVM predicted value (described above) and the measured value shown in FIG. 15, and FIG. 16B is a diagram showing an example of a correspondence relationship between the RF predicted value (described above) and the measured value shown in FIG. 15. Further, FIG. 17A through FIG. 17C are each a diagram showing an example of a correspondence relationship between the RF predicted value and the measured value when using only some of the parameters shown in FIG. 13. Specifically, FIG. 17A shows an example of such a correspondence relationship when using only the parameter (the specific gravity value of the ink 9) the highest in importance out of the parameters shown in FIG. 13. Further, FIG. 17B shows an example of such a correspondence relationship when using only the two parameters (the specific gravity value of the ink 9, and the number of drops) the highest and the second highest in importance out of the parameters shown in FIG. 13. Further, FIG. 17C shows an example of such a correspondence relationship when using only the two parameters (the specific gravity value of the ink 9, and the voltage sensitivity Vr) the highest and the fifth highest in importance out of the parameters shown in FIG. 13. In contrast, FIG. 16A and FIG. 16B each show an example of a correspondence relationship between the predicted value and the measured value when using all of the parameters shown in FIG. 12.

It should be noted that in the example shown in FIG. 15, the measured value of the conversion coefficient Kc described above, and the predicted values (the SVM predicted value and the RF predicted value) of the conversion coefficient Kc by the machine learning are shown so as to correspond to each other for each of the six samples ("Sample 1" through "Sample 6") described above. Further, in the examples shown in FIG. 16A, FIG. 16B, and FIG. 17A through FIG. 17C, defining the predicted value (the SVM predicted value or the RF predicted value) of the conversion coefficient Kc as a variable x, and defining the measured value of the conversion coefficient Kc as a variable y, the (x,y) coordinates in a number of (562) samples are plotted. Further, in FIG. 16A, FIG. 16B, and FIG. 17A through FIG. 17C, an example of a formula (e.g., a linear function formula identified by the method of least squares) representing the tendency of the correlative relationship between these variables x, y is also shown.

First, in the example shown in FIG. 15, it is understood that an accurate prediction with respect to the measured value can be achieved in both of the SVM predicted value and the RF predicted value. Further, in each of the examples shown in FIG. 16A, FIG. 16B, and FIG. 17A through FIG. 17C, the gradient of the linear function formula described above is approximately "1," and at the same time, the intercept in the linear function formula described above is approximately "0," and therefore, the predicted values (the SVM predicted value and the RF predicted value) and the measured value are in the following relationship. That is, it is understood that the predicted value and the measured value have a sufficient correlative relationship to the extent that printing can practically performed using the predicted value. Further, when comparing the examples (the examples of the RF predicted value) shown in FIG. 16B, and FIG. 17A through FIG. 17C to each other, it is understood that the example (the example of the case of using all of the parameters described above) shown in FIG. 16B is relatively higher in degree of coincidence (prediction accuracy) of the predicted value (the RF predicted value) to the measured value compared to the examples (the case of using only some of the parameters described above) shown in FIG. 17A through FIG. 17C. In addition, as described above, only the parameter (the specific gravity value of the ink 9) the highest in importance is used in FIG. 17A, the two parameters the highest and the second highest in importance are used in FIG. 17B, and the two parameters the highest and the fifth highest in importance are used in FIG. 17C. It should be noted that even when using a combination of, for example, other parameters shown in FIG. 12 or FIG. 13 and the specific gravity value of the ink 9 as the explanatory variables, it can be said that the prediction accuracy becomes higher compared to the case (when using only the specific gravity value of the ink 9) of FIG. 17A similarly to the cases of FIG. 17B and FIG. 17C.

(C-4. Functions/Advantages)

In such a manner as described hereinabove, in the characteristic table generation system 5 according to the present embodiment, by using the predetermined analytical method (the first analytical method) described above, the conversion coefficient Kc is generated based on the predetermined parameters Pr described above. Further, by performing the conversion process described above using the measured viscosity characteristic table TMvi described above and the conversion coefficient Kc, the predictive voltage characteristic table TPvp is generated. Thus, the present embodiment results in the following.

That is, the predictive voltage characteristic table TPvp which defines the predictive characteristic curve CPvp between the voltage value Vp (the crest value) and the environmental temperature Ta is automatically generated in each case. Thus, the work burden and the operating cost are reduced compared to when obtaining the characteristic curve (the measured characteristic curve CMvp described above) between these voltage values Vp and the environmental temperature Ta by performing the actual measurement (e.g., when obtaining the characteristic curve by performing the actual measurement for each of the types of the number of pulses included in the drive signal Sd) as in, for example, the comparative example described above. Further, the characteristic curve (the measured characteristic curve CMvp) between the voltage value Vp described above and the environmental temperature Ta generally becomes a curve different in gradient and so on in accordance with the type of the number of pulses included in the drive signal Sd, the class and the role of each of the pulses, and so on as described above, and therefore, the predictive voltage characteristic table TPvp is automatically generated in each case, and thus, the following results. That is, it is possible to accurately set the voltage value Vp (the crest value) of the pulse in the drive signal Sd compared to when, for example, using a single characteristic curve in two or more cases.

Therefore, in the present embodiment, it is possible to increase the efficiency of the work for obtaining the characteristic curve (the voltage characteristic table) between the voltage value Vp described above and the environmental temperature Ta, and at the same time, it is possible to easily improve the setting accuracy of the voltage value Vp (the crest value) of the pulse in the drive signal Sd. As a result, in the present embodiment, it becomes possible to improve the convenience of the user.

Further, in the present embodiment, for example, it becomes possible to obtain such advantages as described below.

Since the characteristic curve between the voltage value Vp described above and the environmental temperature Ta can easily be obtained, the voltage control of making the ejection speed and the drop volume of the ink 9 substantially constant becomes easy even when, for example, the type of the number of pulses described above, the class and the role of each of the pulses, and so on are different.

Since expensive evaluation equipment (a temperature controller and so on) used when obtaining the measured characteristic curve CMvp in such a manner as in the comparative example described above becomes unnecessary, it becomes possible to reduce the cost.

Further, in the present embodiment, the specific gravity of the ink 9 described above, or the physical property value (e.g., the density of the ink 9, and the sound speed in the ink 9) obtained by using the specific gravity of the ink 9 is at least included in the predetermined parameters Pr described above, the following results. That is, when generating the conversion coefficient Kc as the objective variable using the predetermined analytical method described above taking the parameters Pr as the explanatory variables, the conversion coefficient Kc is generated using the parameter (the specific gravity or the physical property value described above of the ink 9 described above) the highest in importance (degree of contribution), and therefore, the generation accuracy (the prediction accuracy of the predictive characteristic curve CPvp described above) of the conversion coefficient Kc increases. As a result, it becomes possible to generate the predictive voltage characteristic table TPvp described above with high accuracy.

Further, in the present embodiment, when it is arranged that at least one of the parameters of the number of drops (the number of pulses) described above, the viscosity value of the ink 9 at the reference temperature Tr, the voltage shift amount ΔVp, and the voltage sensitivity Vr of the ink 9 is further included in the parameters Pr described above, the following results. That is, since the conversion coefficient Kc is generated using the parameter (at least one of the parameters described above) relatively high in importance (degree of contribution) described above in addition to the specific gravity or the physical property value of the ink 9 described above, the generation accuracy (the prediction accuracy of the predictive characteristic curve CPvp) of the conversion coefficient Kc further increases. As a result, it becomes possible to generate the predictive voltage characteristic table TPvp with higher accuracy.

In addition, in the present embodiment, since there is adopted the method of using the machine learning model 74 as the predetermined analytical method (the first analytical method) described above, it becomes possible to easily and accurately generate the predictive voltage characteristic table TPvp.

Further, in the present embodiment, since the preliminary process described above and the add operation are included in the conversion process described above, and at the same time, the voltage value Vp (the voltage value Vp in the predictive characteristic curve CPvp) added with the voltage shift amount ΔVp described above corresponds to the voltage value with which the standard ejection speed or the standard drop volume can be obtained, the following results. That is, it is possible to easily set such a voltage shift amount ΔVp using the standard ejection speed or the standard drop volume, and thus, it becomes possible to further enhance the convenience of the user.

Further, in the present embodiment, since it is arranged that the signal generation section 48 is further disposed in the characteristic table generation system 5, it is possible to obtain the voltage value Vp (the crest value) of the pulse in the drive signal Sd using the predictive voltage characteristic table TPvp generated by the table generation section 733, and then the drive signal Sd is generated using the pulse having the voltage value Vp as a result. Therefore, since the jet operation of the ink 9 is performed using the drive signal Sd generated in such a manner, it is possible to easily improve the ejection characteristic of the ink 9. As a result, it becomes possible to further enhance the convenience of the user.

In addition, in the present embodiment, since it is arranged that the data acquisition section 731, the conversion coefficient generation section 732, and the table generation section 733 described above are each disposed outside (in the information processing device 7) the printer 1, the following results. That is, it is possible to perform the automatic generation of the predictive voltage characteristic table TPvp in the information processing device 7 described above while keeping the existing configuration with respect to the inkjet heads 4 and the printer 1. As a result, it becomes possible to further enhance the convenience of the user.

2. MODIFIED EXAMPLES

Then, some modified examples (Modified Example 1 through Modified Example 6) of the embodiment described above will be described. It should be noted that the same constituents as those in the embodiment described above are denoted by the same reference symbols, and the description thereof will arbitrarily be omitted.

Modified Example 1

In the embodiment described above, there is described when disposing the machine learning model 74 (the first analytical method) taking the conversion coefficient Kc as the objective variable, but in Modified Example 1 described below, there will be described an example of the case of further providing a machine learning model (a second analytical method) taking the voltage sensitivity Vr described above as the objective variable.

(Configuration)

Figure 18:
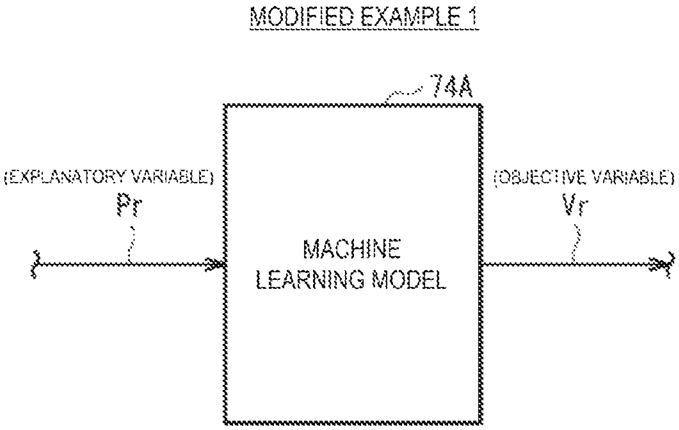
FIG. 18 is a block diagram showing a configuration example of a machine learning model related to Modified Example 1.
Figures 20, 21:
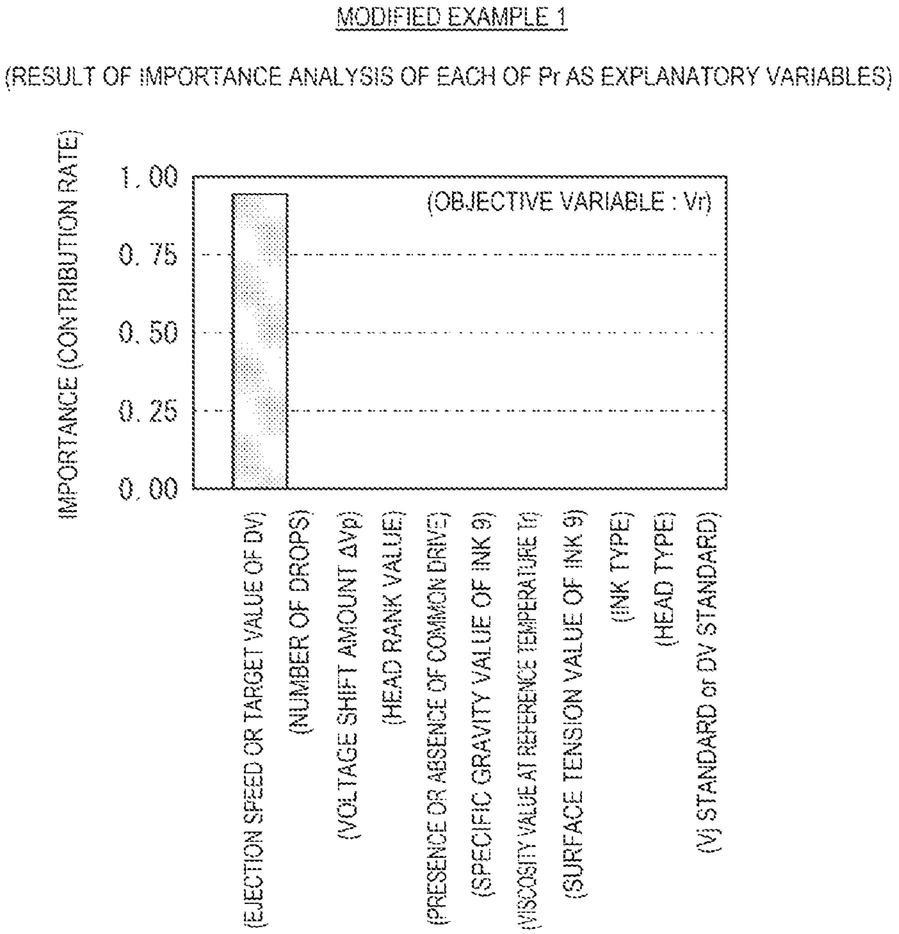
FIG. 20 is a diagram showing an example of a result of an importance analysis of the parameters shown in FIG. 19.
FIG. 21 is a diagram showing an example of predicted values by the machine learning and a measured value related to Modified Example 1.

FIG. 18 is a block diagram showing a configuration example of a machine learning model (a machine learning model 74A) related to Modified Example 1, and FIG. 19 is a diagram showing an example of predetermined parameters Pr (see FIG. 18) related to Modified Example 1. FIG. 20 is a diagram showing an example of a result of an importance analysis of the parameters Pr shown in FIG. 19. It should be noted that in FIG. 19, the values of the parameters Pr are shown with respect to six samples ("sample 1" through "sample 6").

Figure 22A:
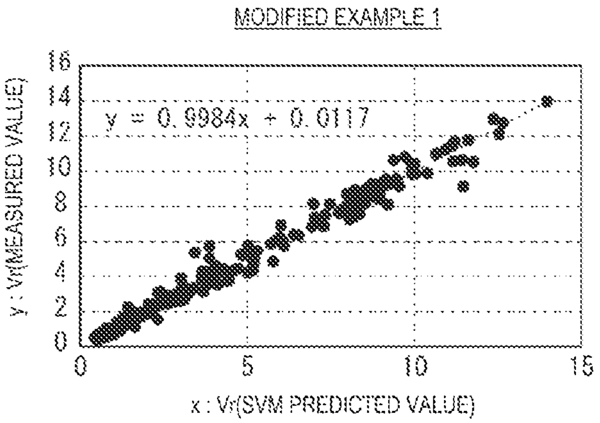
FIG. 22A is a diagram showing an example of a correspondence relationship between the SVM predicted value and the measured value shown in FIG. 21.
Figure 22B:
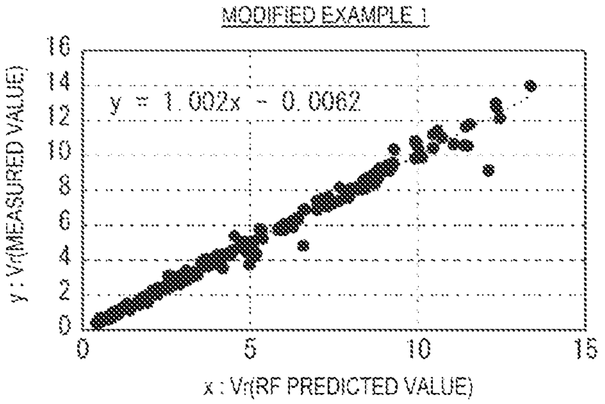
FIG. 22B is a diagram showing an example of a correspondence relationship between the RF predicted value and the measured value shown in FIG. 21.
Figure 23:
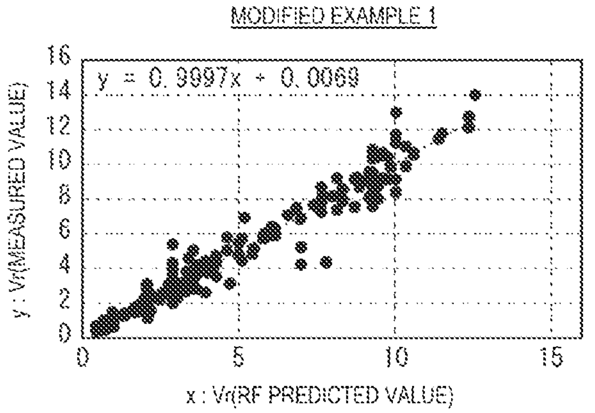
FIG. 23 is a diagram showing an example of a correspondence relationship between the RF predicted value and the measured value when using only some of the parameters shown in FIG. 20.

Further, FIG. 21 is a diagram showing an example of predicted values by the machine learning and measured value related to Modified Example 1. FIG. 22A is a diagram showing an example of a correspondence relationship between the SVM predicted value (described above) and the measured value shown in FIG. 21, and FIG. 22B is a diagram showing an example of a correspondence relationship between the RF predicted value (described above) and the measured value shown in FIG. 21. FIG. 23 is a diagram showing an example of a correspondence relationship between the RF predicted value and the measured value when using only some of the parameters shown in FIG. 20. Specifically, FIG. 23 shows an example of such a correspondence relationship when using only the parameter (the target value of the ejection speed or the DV shown in FIG. 20) the highest in importance out of the parameters shown in FIG. 19. In contrast, FIG. 22A and FIG. 22B each show an example of a correspondence relationship between the predicted value and the measured value when using all of the parameters shown in FIG. 19.

It should be noted that the details of FIG. 21, FIG. 22A, FIG. 22B, and FIG. 23 are substantially the same as in the case of FIG. 15, FIG. 16A, FIG. 16B, and FIG. 17A through FIG. 17C in the embodiment. Specifically, in the example shown in FIG. 21, the measured value of the voltage sensitivity Vr described above, and the predicted values (the SVM predicted value and the RF predicted value) of the voltage sensitivity Vr by the machine learning are shown so as to correspond to each other for each of the six samples ("Sample 1" through "Sample 6") shown in FIG. 19. Further, in the examples shown in FIG. 22A, FIG. 22B, and FIG. 23, defining the predicted value (the SVM predicted value or the RF predicted value) of the voltage sensitivity Vr as a variable x, and defining the measured value of the voltage sensitivity Vr as a variable y, the (x,y) coordinates in a number of (562) samples are plotted. Further, in FIG. 22A, FIG. 22B, and FIG. 23, an example of a formula (e.g., a linear function formula identified by the method of least squares) representing the tendency of the correlative relationship between these variables x, y is also shown.

First, in Modified Example 1, it is arranged that the voltage sensitivity Vr is generated using the predetermined analytical method (the second analytical method) based on the predetermined parameters Pr obtained by the data acquisition section 731. The predetermined analytical method means an analytical method taking the parameters Pr described above as the explanatory variables, and at the same time, taking the voltage sensitivity Vr described above as the objective variable.

Specifically, as shown in, for example, FIG. 18, in Modified Example 1, it is arranged that the voltage sensitivity Vr is generated based on the parameters Pr utilizing an analytical method using the machine learning model 74A. As described above, the machine learning model 74A is a predictive model obtained by performing the mechanical learning taking the parameters Pr as the explanatory variables and taking the voltage sensitivity Vr as the objective variable. Further, as shown in FIG. 18, the machine learning model 74A is arranged to generate (predict) the voltage sensitivity Vr (the objective variable) based on a learning result and then output the voltage sensitivity Vr thus generated when the parameters Pr (the explanatory variables) are input. It should be noted that a specific example of the analytical method (a prediction method) using such a machine learning model 74A is substantially the same as that cited in the embodiment.

Here, as specific examples of the predetermined parameters Pr described above in Modified Example 1, there can be cited those listed in (a) through (g), and (i) through (l) below described in the embodiment as shown in FIG. 19:

(a) the number of drops (the number of pulses)
(b) presence or absence of the common drive
(c) the head type
(d) the ink type
(e) (the Vj standard or the DV standard)
(f) the head rank value
(g) the viscosity value at the reference temperature Tr
(i) the surface tension value of the ink 9
(j) the specific gravity value of the ink 9
(k) the voltage shift amount ΔVp
(l) the target value of the ejection speed or the DV Further, according to an example of the result of the importance analysis of the parameters Pr as the explanatory variables shown in FIG. 20, those become relatively high in importance (contribution rate) described above when generating the voltage sensitivity Vr using the machine learning model 74A are as follows out of the parameters Pr listed in (a) through (g), and (i) through (l) described above. That is, in the example shown in FIG. 20, (l) the target value of the ejection speed or the DV is relatively high (the highest) in importance. Therefore, in Modified Example 1, it is desirable that (l) the target value of the ejection speed or the DV which is the highest in importance is at least included in the predetermined parameters Pr described above.

Further, in the example shown in FIG. 21, it is understood that an accurate prediction with respect to the measured value can be achieved in both of the SVM predicted value and the RF predicted value. Further, in each of the examples shown in FIG. 22A, FIG. 22B, and FIG. 23, the gradient of the linear function formula (the formula representing the tendency of the correlative relationship between the variables x, y) described above is approximately "1," and at the same time, the intercept in the linear function formula is approximately "0." Therefore, in Modified Example 1, regarding the voltage sensitivity Vr as the objective variable, the predicted values (the SVM predicted value and the RF predicted value) and the measured value are in the following relationship. That is, similarly to the case of the embodiment described above, it is understood that the predicted value and the measured value have a sufficient correlative relationship to the extent that printing can practically performed using the predicted value. Further, when comparing the examples (the examples of the RF predicted value) shown in FIG. 22B and FIG. 23 to each other, it is understood that the example (the example of the case of using all of the parameters described above) shown in FIG. 22B is relatively higher in degree of coincidence of the predicted value (the RF predicted value) to the measured value compared to the example (the case of using only some of the parameters described above) shown in FIG. 23.

(Functions/Advantages)

In Modified Example 1 having such a configuration as well, it is also possible to obtain basically the same advantages due to substantially the same function as that of the embodiment.

Further, in particular in Modified Example 1, since the voltage sensitivity Vr (one of the predetermined parameters Pr in the embodiment) described in the embodiment is also generated using the predetermined analytical method (the second analytical method), the following results. That is, regarding the voltage sensitivity Vr, it becomes unnecessary to obtain the measured value in advance, and thus, the work burden and the operating cost are further reduced. Further, it is possible to accurately set the value of the voltage sensitivity Vr compared to when, for example, using a single value in two or more cases. Therefore, it becomes possible to further enhance the convenience of the user.

Further, in Modified Example 1 as well, similarly to the embodiment, since there is adopted the method of using the machine learning model 74A as the predetermined analytical method (the second analytical method) described above, it becomes possible to easily and accurately predict the voltage sensitivity Vr as the objective variable.

Modified Example 2

In the embodiment described above, there is described when disposing the machine learning model 74 (the first analytical method) taking the conversion coefficient Kc as the objective variable, but in Modified Example 2 described below, there will be described an example of the case of further providing a machine learning model (a third analytical method) taking the voltage shift amount ΔVp described above as the objective variable. It should be noted that it is also possible to arrange to use, for example, both of Modified Example 2 and Modified Example 1 described above in combination.

(Configuration)

Figure 24:
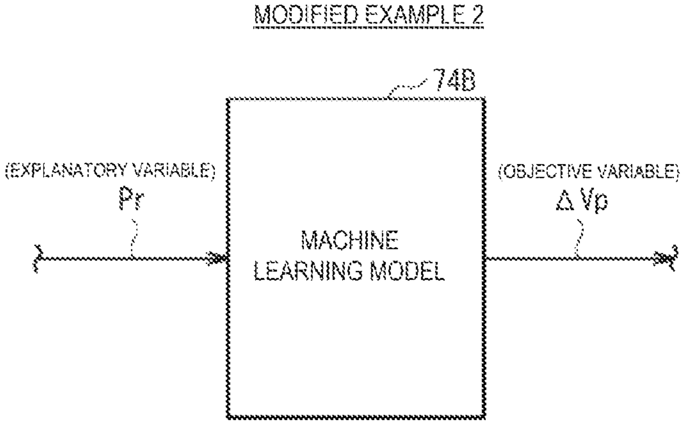
FIG. 24 is a block diagram showing a configuration example of a machine learning model related to Modified Example 2.
Figure 26:
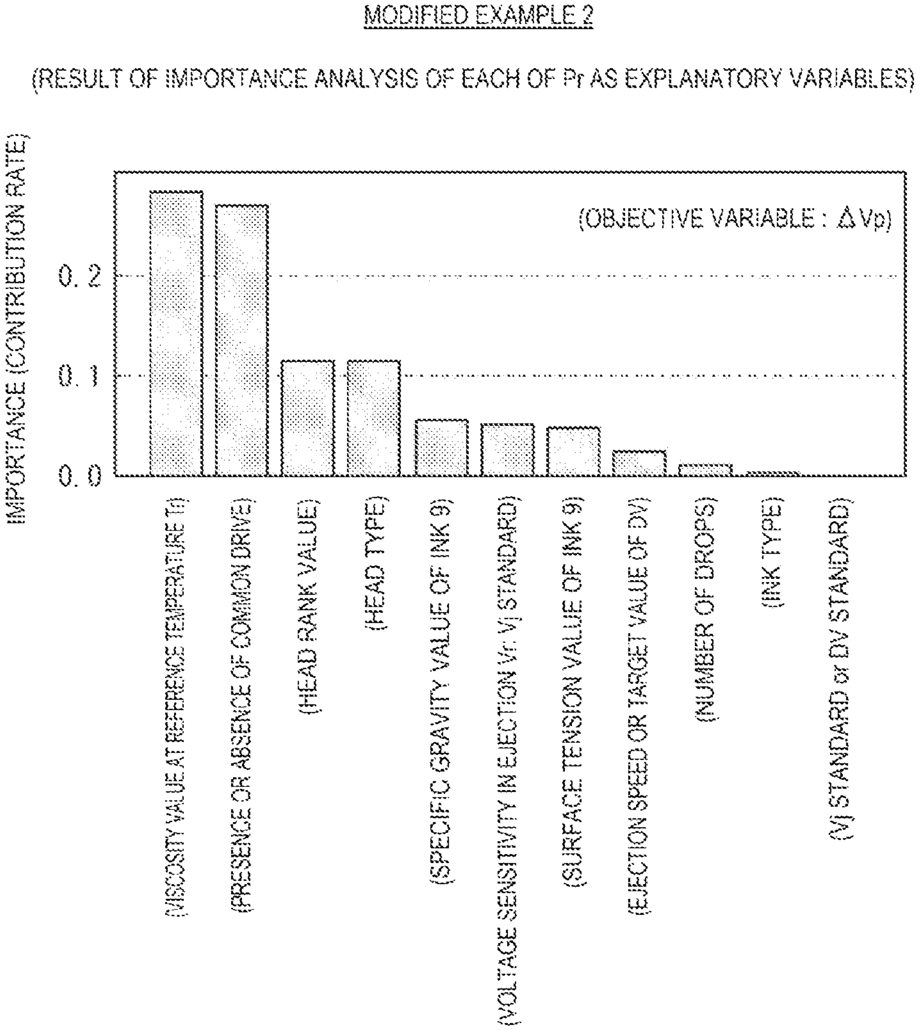
FIG. 26 is a diagram showing an example of a result of an importance analysis of the parameters shown in FIG. 25.

FIG. 24 is a block diagram showing a configuration example of a machine learning model (a machine learning model 74B) related to Modified Example 2, and FIG. 25 is a diagram showing an example of predetermined parameters Pr (see FIG. 24) related to Modified Example 2. FIG. 26 is a diagram showing an example of a result of an importance analysis of the parameters Pr shown in FIG. 25. It should be noted that in FIG. 25, the values of the parameters Pr are shown with respect to six samples ("sample 1" through "sample 6").

Figure 29A:
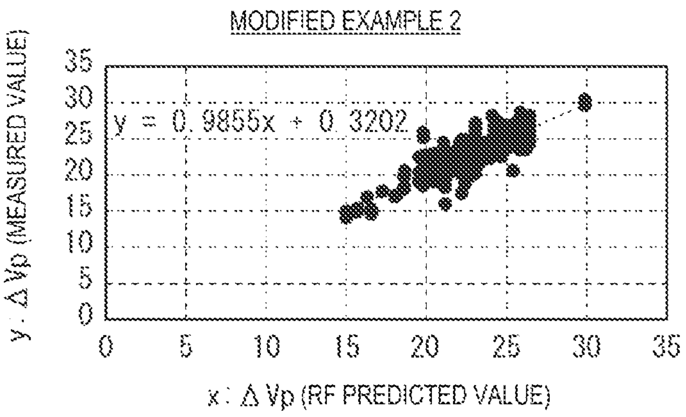
FIG. 29A is a diagram showing an example of a correspondence relationship between the RF predicted value and the measured value when using only some of the parameters shown in FIG. 26.
Figure 29B:
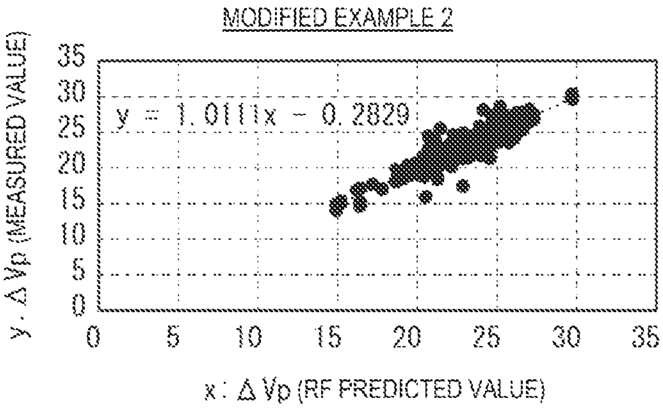
FIG. 29B is a diagram showing an example of a correspondence relationship between the RF predicted value and the measured value when using only some of the parameters shown in FIG. 26.
Figure 29C:
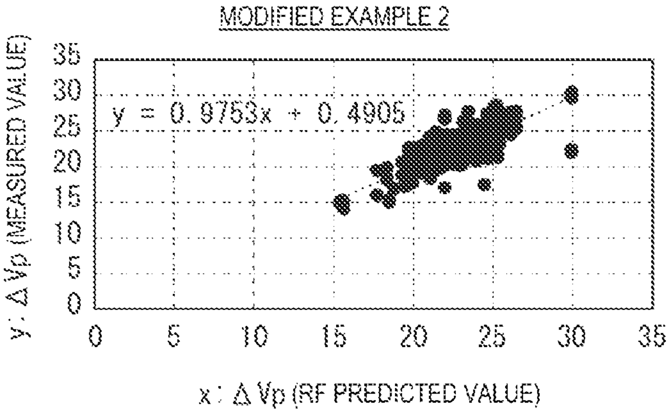
FIG. 29C is a diagram showing an example of a correspondence relationship between the RF predicted value and the measured value when using only some of the parameters shown in FIG. 26.

Further, FIG. 27 is a diagram showing an example of predicted values by the machine learning and measured value related to Modified Example 2. FIG. 28A is a diagram showing an example of a correspondence relationship between the SVM predicted value (described above) and the measured value shown in FIG. 27, and FIG. 28B is a diagram showing an example of a correspondence relationship between the RF predicted value (described above) and the measured value shown in FIG. 27. Further, FIG. 29A through FIG. 29C are each a diagram showing an example of a correspondence relationship between the RF predicted value and the measured value when using only some of the parameters shown in FIG. 26. Specifically, FIG. 29A shows an example of such a correspondence relationship when using only the parameter (the viscosity value at the reference temperature Tr) the highest in importance out of the parameters shown in FIG. 26. Further, FIG. 29B shows an example of such a correspondence relationship when using only the two parameters (the viscosity value at the reference temperature Tr, and presence or absence of the common drive) the highest and the second highest in importance out of the parameters shown in FIG. 26. Further, FIG. 29C shows an example of such a correspondence relationship when using only the parameter (the surface tension value of the ink 9) the seventh highest in importance out of the parameters shown in FIG. 26. In contrast, FIG. 28A and FIG. 28B each show an example of a correspondence relationship between the predicted value and the measured value when using all of the parameters shown in FIG. 25.

It should be noted that the details of FIG. 27, FIG. 28A, FIG. 28B, and FIG. 29A through FIG. 29C are substantially the same as in the case of FIG. 15, FIG. 16A, FIG. 16B, and FIG. 17A through FIG. 17C in the embodiment. Specifically, in the example shown in FIG. 27, the measured value of the voltage shift amount ΔVp described above, and the predicted values (the SVM predicted value and the RF predicted value) of the voltage shift amount ΔVp by the machine learning are shown so as to correspond to each other for each of the six samples ("Sample 1" through "Sample 6") shown in FIG. 25. Further, in the examples shown in FIG. 28A, FIG. 28B, and FIG. 29A through FIG. 29C, defining the predicted value (the SVM predicted value or the RF predicted value) of the voltage shift amount ΔVp as a variable x, and defining the measured value of the voltage shift amount ΔVp as a variable y, the (x,y) coordinates in a number of (562) samples are plotted. Further, in FIG. 28A, FIG. 28B, and FIG. 29A through FIG. 29C, an example of a formula (e.g., a linear function formula identified by the method of least squares) representing the tendency of the correlative relationship between these variables x, y is also shown.

First, in Modified Example 2, it is arranged that the voltage shift amount ΔVp is generated using the predetermined analytical method (the third analytical method) based on the predetermined parameters Pr obtained by the data acquisition section 731. The predetermined analytical method means an analytical method taking the parameters Pr described above as explanatory variables, and at the same time, taking the voltage shift amount ΔVp described above as an objective variable.

Specifically, as shown in, for example, FIG. 24, in Modified Example 2, it is arranged that the voltage shift amount ΔVp is generated based on the parameters Pr utilizing an analytical method using the machine learning model 74B. As described above, the machine learning model 74B is a predictive model obtained by performing the mechanical learning taking the parameters Pr as the explanatory variables and taking the voltage shift amount ΔVp as the objective variable. Further, as shown in FIG. 24, the machine learning model 74B is arranged to generate (predict) the voltage shift amount ΔVp (the objective variable) based on a learning result and then output the voltage shift amount ΔVp thus generated when the parameters Pr (the explanatory variables) are input. It should be noted that a specific example of the analytical method (a prediction method) using such a machine learning model 74B is substantially the same as that cited in the embodiment.

Here, as specific examples of the predetermined parameters Pr described above in Modified Example 2, there can be cited those listed in (a) through (j), and (l) below described in the embodiment and Modified Example 1 as shown in FIG. 25:

(a) the number of drops (the number of pulses)
(b) presence or absence of the common drive
(c) the head type
(d) the ink type
(e) (the Vj standard or the DV standard)

(f) the head rank value
(g) the viscosity value at the reference temperature Tr
(h) the voltage sensitivity Vr (the Vj standard or the DV standard) when performing ejection
(i) the surface tension value of the ink 9
(j) the specific gravity value of the ink 9
(l) the target value of the ejection speed or the DV Further, according to an example of the result of the importance analysis of the parameters Pr as the explanatory variables shown in FIG. 26, those become relatively high in importance (contribution rate) described above when generating the voltage shift amount ΔVp using the machine learning model 74B are as follows out of the parameters Pr listed in (a) through (j), and (l) described above. That is, in the example shown in FIG. 26, such importance is relatively high in the order of (g) the viscosity value at the reference temperature Tr, (b) presence or absence of the common drive, (f) the head rank value, (c) the head type, (j) the specific gravity value of the ink 9, (h) the voltage sensitivity Vr when performing ejection, (i) the surface tension value of the ink 9, (l) the target value of the ejection speed or the DV, (a) the number of drops, (d) the ink type, and (e) (the Vj standard or the DV standard).

Therefore, in Modified Example 2, it is desirable that at least one of (g) the viscosity value at the reference temperature Tr, and (b) presence or absence of the common drive which are relatively high in importance (the highest and the second highest in importance, as an example) out of the parameters listed above is at least included in the predetermined parameters Pr described above. Further, it can be said that it is desirable that at least one of the parameters relatively high in importance (the third through seventh highest in importance, as an example) out of the rest of the parameters shown in FIG. 26, namely (f) the head rank value, (c) the head type, (j) the specific gravity value of the ink 9, (h) the voltage sensitivity Vr when performing ejection, and (i) the surface tension value of the ink 9, is further included in the predetermined parameters Pr described above.

Further, in the example shown in FIG. 27, it is understood that an accurate prediction with respect to the measured value can be achieved in both of the SVM predicted value and the RF predicted value. Further, in each of the examples shown in FIG. 28A, FIG. 28B, and FIG. 29A through FIG. 29C, the gradient of the linear function formula (the formula representing the tendency of the correlative relationship between the variables x, y) described above is approximately "1," and at the same time, the intercept in the linear function formula is approximately "0." Therefore, in Modified Example 2, regarding the voltage shift amount ΔVp as the objective variable, the predicted values (the SVM predicted value and the RF predicted value) and the measured value are in the following relationship. That is, similarly to the case of the embodiment described above and Modified Example 1, it is understood that the predicted value and the measured value have a sufficient correlative relationship to the extent that printing can practically performed using the predicted value. Further, when comparing the examples (the examples of the RF predicted value) shown in FIG. 28B, and FIG. 29A through FIG. 29C to each other, it is understood that the example (the example of the case of using all of the parameters described above) shown in FIG. 28B is relatively higher in degree of coincidence of the predicted value (the RF predicted value) to the measured value compared to the examples (the case of using only some of the parameters described above) shown in FIG. 29A through FIG. 29C.

(Functions/Advantages)

In Modified Example 2 having such a configuration as well, it is also possible to obtain basically the same advantages due to substantially the same function as that of the embodiment.

Further, in particular in Modified Example 2, since the voltage shift amount ΔVp (the parameter used in the add operation described in the embodiment) described in the embodiment is also generated using the predetermined analytical method (the third analytical method), the following results. That is, regarding the voltage shift amount ΔVp as well, it becomes unnecessary to obtain the measured value in advance, and thus, the work burden and the operating cost are further reduced. Further, it is possible to accurately set the value of the voltage shift amount ΔVp compared to when, for example, using a single value in two or more cases. Therefore, it becomes possible to further enhance the convenience of the user.

Further, in Modified Example 2 as well, similarly to the embodiment and Modified Example 1, since there is adopted the method of using the machine learning model 74B as the predetermined analytical method (the third analytical method) described above, it becomes possible to easily and accurately predict the voltage shift amount ΔVp as the objective variable.

Modified Example 3

(Configuration)

Figure 30:
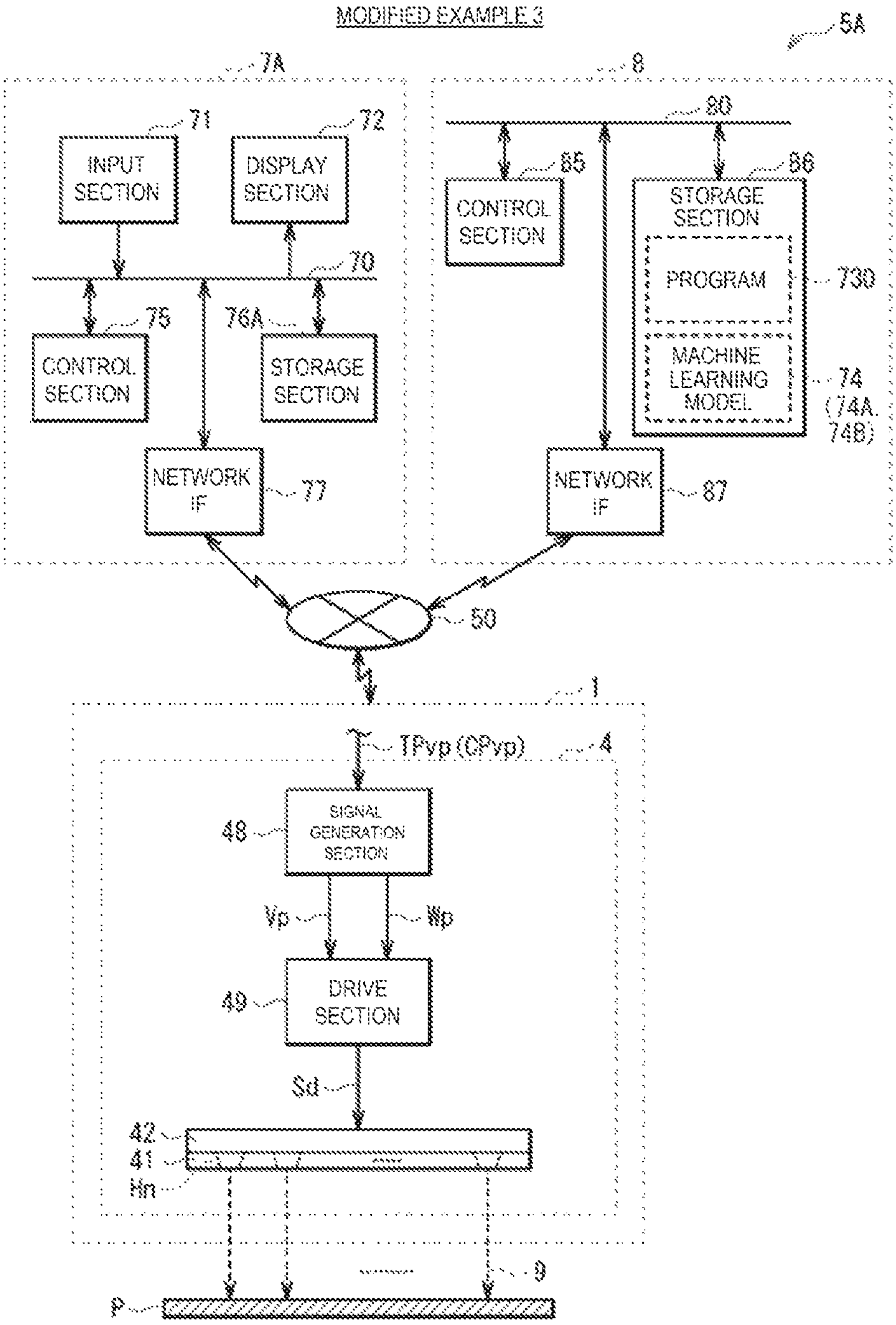
FIG. 30 is a block diagram showing a configuration example of a characteristic table generation system according to Modified Example 3.

FIG. 30 is a block diagram showing a configuration example of a characteristic table generation system 5A according to Modified Example 3. The characteristic table generation system 5A according to Modified Example 3 is provided with the printer 1 having the inkjet heads 4, and an information processing device 7A and a server 8 located outside the printer 1. Further, the printer 1, the information processing device 7A, and the server 8 are connected to each other via the network 50. In other words, the characteristic table generation system 5A corresponds to a system obtained by disposing the information processing device 7A instead of the information processing device 7 in the characteristic table generation system 5 according to the embodiment, and at the same time, further providing the server 8 to the characteristic table generation system 5.

It should be noted that in Modified Example 3, the server 8 described above corresponds to a specific example of an "external device" in the present disclosure.

As shown in FIG. 30, the information processing device 7A has the bus 70, the input section 71, the display section 72, the control section 75, a storage section 76A, and the network IF 77 as a physical block configuration. In other words, the information processing device 7A corresponds to a device obtained by disposing the storage section 76A instead of the storage section 76 in the information processing device 7 in the embodiment shown in FIG. 4. Unlike the storage section 76, the storage section 76A does not store the program 730 and the machine learning model 74 described in the embodiment. Therefore, the information processing device 7A is, for example, made to correspond to a PC having a common (general-purpose) configuration.

As shown in FIG. 30, the server 8 has a bus 80, a control section 85, a storage section 86, and a network IF 87 as a physical block configuration. It should be noted that the control section 85, the storage section 86, and the network IF 87 are connected to each other via the bus 80. The control section 85 and the network IF 87 respectively have substantially the same configurations as those of the control section 75 and the network IF 77 in the embodiment (FIG. 4).

Further, the storage section 86 also has substantially the same configuration as that of the storage section 76 in the embodiment (FIG. 4). In other words, as shown in FIG. 30, the storage section 86 stores the program 730 and the machine learning model 74 described in the embodiment. It should be noted that as described with parentheses in FIG. 30, it is possible to arrange that the machine learning models 74A, 74B described in Modified Example 1 and the Modified Example 2 are disposed in addition to such a machine learning model 74, which also applies to Modified Example 4 through Modified Example 6 described later.

In such a manner, in the characteristic table generation system 5A according to Modified Example 3, it is arranged that the predictive voltage characteristic table TPvp described above is generated in the server 8 instead of the information processing device 7A unlike the characteristic table generation system 5 according to the embodiment. Further, the predictive voltage characteristic table TPvp generated in such a manner is arranged to be supplied to the signal generation section 48 in the inkjet head 4 in the printer 1 from the server 8 via the network 50 as shown in FIG. 30.

(Functions/Advantages)

Also in Modified Example 3 having such a configuration, it is possible to obtain substantially the same advantages due to substantially the same function as that of the characteristic table generation system 5 according to the embodiment in the elementary sense as a whole of the characteristic table generation system 5A.

Further, in particular in Modified Example 3, since it is arranged that the data acquisition section 731, the conversion coefficient generation section 732, and the table generation section 733 (the program 730 described above) described above are each disposed outside (in the server 8) the printer 1, the following results. That is, it is possible to perform the automatic generation of the predictive voltage characteristic table TPvp in the server 8 described above while keeping the existing configuration with respect to the inkjet heads 4 and the printer 1 similarly to the case of the embodiment described above. Further, in Modified Example 3, the existing (general-purpose) configuration can also be used in the information processing device 7A as described above, and it is possible to obtain substantially the same advantages as in the embodiment using the server 8 which functions as, for example, a cloud server. As a result, in Modified Example 3, it becomes possible to further enhance the convenience of the user.

Modified Example 4

(Configuration)

Figure 31:
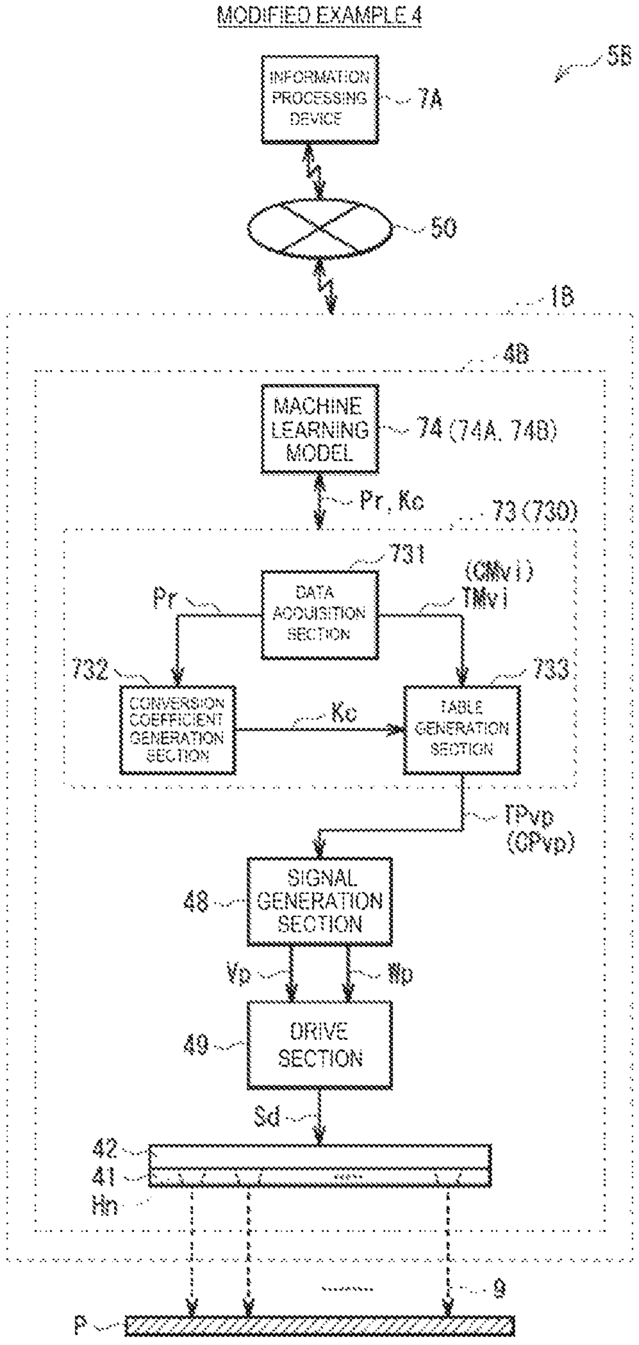
FIG. 31 is a block diagram showing a configuration example of a characteristic table generation system according to Modified Example 4.

FIG. 31 is a block diagram showing a configuration example of a characteristic table generation system 5B according to Modified Example 4. The characteristic table generation system 5B according to Modified Example 4 is provided with a printer 1B having inkjet heads 4B, and the information processing device 7A described above. Further, the printer 1B and the information processing device 7A are connected to each other via the network 50. In other words, the characteristic table generation system 5B corresponds to a system obtained by disposing the information processing device 7A instead of the information processing device 7, and at the same time, disposing the printer 1B and the inkjet heads 4B instead of the printer 1 and the inkjet heads 4 in the characteristic table generation system 5 according to the embodiment.

It should be noted that the printer 1B described above corresponds to a specific example of the "liquid jet recording device" in the present disclosure. Further, the inkjet head 4B described above corresponds to a specific example of the "liquid jet head" in the present disclosure.

In Modified Example 4, as shown in FIG. 31, the information processing section 73 (the data acquisition section 731, the conversion coefficient generation section 732, and the table generation section 733) described above, in other words, the program 730 described above, is disposed in the inkjet head 4B. Further, the machine learning model 74 described above is also disposed in the inkjet head 4B. In other words, in Modified Example 4, unlike the embodiment and Modified Example 3, the information processing section 73 (the program 730) and the machine learning model 74 are disposed in the inkjet head 4B incorporated in the printer 1B.

(Functions/Advantages)

Also in Modified Example 4 having such a configuration, it is possible to obtain substantially the same advantages due to substantially the same function as that of the characteristic table generation system 5 according to the embodiment in the elementary sense as a whole of the characteristic table generation system 5B.

Further, in particular in Modified Example 4, since it is arranged that the data acquisition section 731, the conversion coefficient generation section 732, and the table generation section 733 are each disposed in the printer 1B, the following results. That is, unlike the embodiment and Modified Example 3, it becomes unnecessary to prepare each of the data acquisition section 731, the conversion coefficient generation section 732, and the table generation section 733 in the external device (the information processing device 7 or the server 8). Thus, it is possible to perform the automatic generation of the predictive voltage characteristic table TPvp by the printer 1B itself, and as a result, it becomes possible to further enhance the convenience of the user.

Further, in Modified Example 4, since it is arranged that the data acquisition section 731, the conversion coefficient generation section 732, and the table generation section 733 described above are each disposed in the inkjet head 4B incorporated in the printer 1B, the following results. That is, it is possible to perform the automatic generation of the predictive voltage characteristic table TPvp by the inkjet head 4B itself while keeping the existing configuration with respect to the printer 1B themselves other than the inkjet heads 4B. As a result, it becomes possible to further enhance the convenience of the user.

Modified Example 5

(Configuration)

Figure 32:
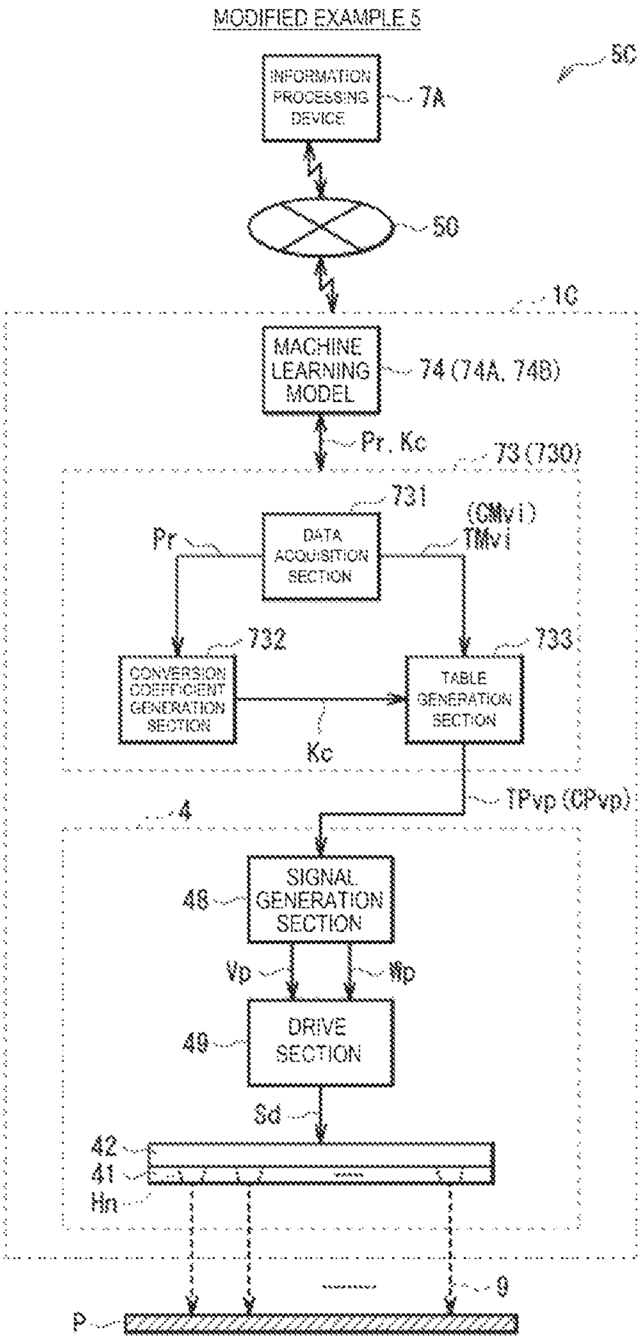
FIG. 32 is a block diagram showing a configuration example of a characteristic table generation system according to Modified Example 5.

FIG. 32 is a block diagram showing a configuration example of a characteristic table generation system 5C according to Modified Example 5. The characteristic table generation system 5C according to Modified Example 5 is provided with a printer 1C having the inkjet heads 4 described above, and the information processing device 7A described above. Further, the printer 1C and the information processing device 7A are connected to each other via the network 50. In other words, the characteristic table generation system 5C corresponds to a system obtained by disposing the information processing device 7A described above instead of the information processing device 7, and at the same time, providing the printer 1C instead of the printer 1 in the characteristic table generation system 5 according to the embodiment.

It should be noted that the printer 1C described above corresponds to a specific example of the "liquid jet recording device" in the present disclosure.

In Modified Example 5, as shown in FIG. 32, the information processing section 73 (the data acquisition section 731, the conversion coefficient generation section 732, and the table generation section 733) described above, in other words, the program 730 described above, is disposed in the printer 1C similarly to Modified Example 4 (FIG. 31). Further, the machine learning model 74 described above is also disposed in the printer 1C similarly to Modified Example 4. It should be noted that as shown in FIG. 32, in Modified Example 5, unlike Modified Example 4, the information processing section 73 (the program 730) and the machine learning model 74 are all disposed outside the inkjet head 4 in the printer 1C.

(Functions/Advantages)

Also in Modified Example 5 having such a configuration, it is possible to obtain substantially the same advantages due to substantially the same function as that of the characteristic table generation system 5 according to the embodiment in the elementary sense as a whole of the characteristic table generation system 5C.

Further, in particular in Modified Example 5, similarly to Modified Example 4 described above, since it is arranged that the data acquisition section 731, the conversion coefficient generation section 732, and the table generation section 733 are each disposed in the printer 1C, the following results. That is, similarly to the case of Modified Example 4, it is possible to perform the automatic generation of the predictive voltage characteristic table TPvp by the printer 1C itself, and as a result, it becomes possible to further enhance the convenience of the user.

Modified Example 6

(Configuration)

Figure 33:
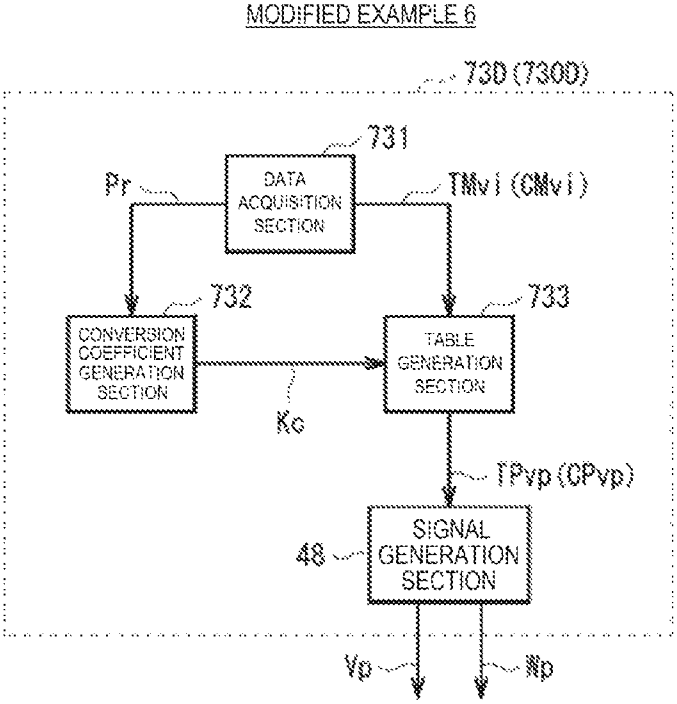
FIG. 33 is a block diagram showing a configuration example of an information processing section related to Modified Example 6.

FIG. 33 is a block diagram showing a configuration example of an information processing section 73D (a program 730D) related to Modified Example 6. The information processing section 73D in Modified Example 6 corresponds to a section obtained by further providing the signal generation section 48 described above to the information processing section 73 (having the data acquisition section 731, the conversion coefficient generation section 732, and the table generation section 733) described in the embodiment and so on. In other words, the program 730D in Modified Example 6 corresponds to what is obtained by making the program 730 described in the embodiment and so on further include a function of the processing executed by the signal generation section 48 described above.

The configuration of such an information processing section 73D (the program 730D) corresponds to a section obtained by further disposing the configuration and the function of the signal generation section 48 in the external device (the information processing device 7 or the server 8) of the printer 1 as in, for example, the embodiment or Modified Example 3 in addition to the information processing section 73 (the program 730). In other words, the configuration of the information processing section 73D corresponds to an example in which the configuration and the function of the signal generation section 48 are disposed not in the printer 1 but in the external device (the information processing device 7 or the server 8) of the printer 1 unlike the embodiment and Modified Example 3.

(Functions/Advantages)

In Modified Example 6 having such a configuration, it is also possible to obtain basically the same advantages due to substantially the same function as that of the embodiment.

Further, in particular in Modified Example 6, since it is arranged that the configuration and the function of the signal generation section 48 are further disposed in the information processing section 73D (the program 730D), it is possible to execute the operation (the operation of generating the drive signal Sd) of the signal generation section 48 in a lump in the information processing section 73D (the program 730D). As a result, it becomes possible to further enhance the convenience of the user.

3. OTHER MODIFIED EXAMPLES

The present disclosure is described hereinabove citing the embodiment and the modified examples, but the present disclosure is not limited to the embodiment and so on, and a variety of modifications can be adopted.

For example, in the embodiment and so on described above, the description is presented specifically citing the configuration examples (the shapes, the arrangements, the number and so on) of each of the members in the printer and the inkjet head, but those described in the above embodiment and so on are not limitations, and it is possible to adopt other shapes, arrangements, numbers and so on. Specifically, for example, in the embodiment described above, the description is presented citing the shuttle type printer in which the inkjet heads are translated as an example, but this example is not a limitation, and it is possible to adopt, for example, a single-pass type printer in which the inkjet heads are fixed. Further, in the embodiment and so on described above, the description is presented citing the case in which the ink tanks are housed in a predetermined chassis as an example, but this example is not a limitation, and it is possible to arrange that the ink tanks are disposed outside the chassis. Further, in the embodiment and so on described above, the description is presented mainly citing the case in which the signal generation section is disposed in the inkjet head as an example, this example is not a limitation, and it is possible to arrange that the signal generation section is disposed outside the inkjet head in the printer.

Further, as the structure of the inkjet head, it is possible to apply those of a variety of types. Specifically, for example, it is possible to adopt a so-called side-shoot type inkjet head which emits the ink 9 from a central portion in the extending direction of each of the ejection channels in the actuator plate. Alternatively, it is possible to adopt, for example, a so-called edge-shoot type inkjet head for ejecting the ink 9 along the extending direction of each of the ejection channels. Further, the type of the printer is not limited to the type described in the embodiment and so on described above, and it is possible to apply a variety of types such as a thermal type (a thermal on-demand type), an MEMS (Micro Electro-Mechanical Systems) type.

Further, in the embodiment and so on described above, the description is presented citing the non-circulation type inkjet head for using the ink 9 without circulating the ink 9 between the ink tank and the inkjet head as an example, but this example is not a limitation. Specifically, for example, it is also possible to apply the present disclosure to a circulation type inkjet head using the ink 9 while circulating the ink 9 between the ink tank and the inkjet head.

In addition, in the embodiment and so on described above, the description is presented specifically citing the examples of the characteristic table (the predictive voltage characteristic table TPvp), the generation process of the drive signal Sd, and so on, but the examples cited in the embodiment and so on are not a limitation, and it is possible to perform the generation process of the characteristic table and the drive signal Sd, and so on using other methods. Specifically, in the embodiment and so on described above, the description is presented citing the method using the machine learning model as an example of the predetermined analytical methods (the first through third analytical methods) described above, but this method is not a limitation, and it is possible to arrange to use other analytical methods. Further, the predetermined parameters Pr described above are not limited to the variety of parameters cited in the embodiment and so on, and it is possible to arrange to add other parameters to (or substitute other parameters for) the parameters cited in the embodiment and so on to be used in the analytical method. Further, in the embodiment and so on described above, the description is presented citing the case in which both of the pulse width Wp and the voltage value (the crest value) Vp in the pulse are set (automatically adjusted), and then the drive signal Sd is generated as an example, but this example is not a limitation. Specifically, for example, it is possible to set only the pulse width Wp out of the pulse width Wp and the voltage value Vp in the pulse, and then generate the drive signal Sd. In addition, in the embodiment and so on described above, the description is presented citing the case in which the voltage values Vp in the plurality of pulses are all set to the same value as an example, but it is possible to arrange that, for example, the voltage values Vp in the plurality of pulses are not the same value (at least some of the voltage values Vp are set to a different value). Even in such a case, it is possible to arrange to use the plurality of types of voltage values Vp respectively as the explanatory variables to execute the generation process of the predictive voltage characteristic table TPvp explained in the embodiment and so on described above, and so on.

Further, in the embodiment and so on described above, there is described the case in which the pulses (the pulses Pa, Pb, and Pc) for expanding the volume of each of the ejection channels are the pulses (positive pulses) for expanding the volume during a period in a High state, but this case is not a limitation. Specifically, besides the case of the pulse for expanding the volume during the period in the High state and contracting the volume during a period in a Low state, it is also possible to adopt pulses (negative pulses) for expanding the volume during the period in the Low state and contracting the volume during the period in the High state by contraries. It should be noted that in the case of such negative pulses as well, it is possible for the method of exerting the same function as in the "common drive" described above to apply such "common drive."

Further, for example, it is also possible to arrange that a pulse for helping the ejection of the droplet is additionally applied during the OFF period immediately after the ON period. As the pulse for helping the ejection of the droplet, there can be cited, for example, a pulse for contracting the volume of each of the ejection channels, and a pulse (an auxiliary pulse) for pulling back a part of the droplet having been ejected. Further, the pulse (a main pulse) to be applied immediately before the auxiliary pulse as latter one of the pulses has, for example, the pulse width no larger than the width of the on-pulse peak (AP). It should be noted that even if such a pulse for helping the ejection of the droplet is added, the content of the present disclosure described hereinabove is not affected.

Further, the series of processes described in the above embodiment and so on can be arranged to be performed by hardware (a circuit), or can also be arranged to be performed by software (a program). When arranging that the series of processes is performed by the software, the software is constituted by a program group for making the computer perform the functions. The programs can be incorporated in advance in the computer described above and are then used, or can also be installed in the computer described above from a network or a recording medium and are then used. It should be noted that as a recording medium (a non-transitory computer-readable recording medium) on which such programs are recorded, there can be cited a variety of types of media such as a floppy (a registered trademark) disk, a CD (Compact Disk)-ROM, a DVD (Digital Versatile Disc)-ROM, and a hard disk.

Further, in the above embodiment and so on, the description is presented citing the printer 1 (the inkjet printer) as a specific example of the "liquid jet recording device" in the present disclosure, but this example is not a limitation, and it is also possible to apply the present disclosure to other devices than the inkjet printer. In other words, it is also possible to arrange that the "liquid jet head" (the inkjet head) of the present disclosure is applied to other devices than the inkjet printer. Specifically, it is also possible to arrange that the "liquid jet head" of the present disclosure is applied to a device such as a facsimile or an on-demand printer.

In addition, it is also possible to apply the variety of examples described hereinabove in arbitrary combination.

It should be noted that the advantages described in the specification are illustrative only but are not a limitation, and other advantages can also be provided.

Further, the present disclosure can also take the following configurations.

<1> A characteristic table generation system configured to generate a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the characteristic table generation system comprising: a data acquisition section configured to obtain a measured viscosity characteristic table defining a measured characteristic curve between viscosity and temperature of the liquid, and a predetermined parameter separately, as input data; a conversion coefficient generation section configured to generate a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and a table generation section configured to perform the conversion process using the measured viscosity characteristic table and the conversion coefficient generated by the conversion coefficient generation section to thereby generate the predictive voltage characteristic table.

<2> The characteristic table generation system according to <1>, wherein the predetermined parameter includes at least one of a specific gravity of the liquid and a physical property value obtained using the specific gravity of the liquid.

<3> The characteristic table generation system according to <2>, wherein the conversion process includes a preliminary process of generating a preliminary characteristic curve representing a relationship between a voltage value and temperature from the measured characteristic curve using the conversion coefficient, and an add operation of adding a voltage shift amount to the voltage value in the preliminary characteristic curve to thereby generate the predictive characteristic curve, and the predetermined parameter further includes at least one of parameters of a number of drops corresponding to a number of the pulses included in a unit period in the drive signal, a viscosity value of the liquid at a reference temperature, the voltage shift amount, and a voltage sensitivity of the liquid corresponding to a variation per unit voltage in either one of ejection speed of the liquid and a drop volume of the liquid when the liquid is jetted at the reference temperature.

<4> The characteristic table generation system according to <3>, wherein the voltage sensitivity of the liquid is generated based on a target value of either one of the ejection speed of the liquid and the drop volume of the liquid, using a second analytical method as the predetermined analytical method which takes the target value of either one of the ejection speed of the liquid and the drop volume of the liquid as the explanatory variable, and which takes the voltage sensitivity of the liquid as the objective variable.

<5> The characteristic table generation system according to any one of <1> to <4>, wherein the conversion process includes a preliminary process of generating a preliminary characteristic curve representing a relationship between a voltage value and temperature from the measured characteristic curve, using the conversion coefficient, and an add operation of adding a voltage shift amount to the voltage value in the preliminary characteristic curve to thereby generate the predictive characteristic curve, and the voltage value added with the voltage shift amount corresponds to either one of a voltage value with which a standard ejection speed of the liquid is obtained as the predetermined standard value, and a voltage value with which a standard drop volume of the liquid is obtained as the predetermined standard value, when the liquid is jetted from the jet section.

<6> The characteristic table generation system according to <5>, wherein using a third analytical method as the predetermined analytical method which includes at least one of a parameter representing a viscosity value of the liquid at a reference temperature and a parameter representing presence or absence of common drive in the drive signal in the explanatory variable, and which takes the voltage shift amount as the objective variable, the voltage shift amount is generated based on the explanatory variable including at least one of the parameters.

<7> The characteristic table generation system according to <6>, wherein the explanatory variable in the third analytical method further includes at least one of parameters of a head rank value which corresponds to the voltage value with which a predetermined ejection speed is achieved when a predetermined test liquid is jetted from the jet section, and which is a value inherent in a liquid jet head having the jet section, a type of the liquid jet head, a specific gravity of the liquid, a voltage sensitivity of the liquid corresponding to a variation per unit voltage in either one of ejection speed of the liquid and a drop volume of the liquid when the liquid is jetted at the reference temperature, and a surface tension value of the liquid.

<8> The characteristic table generation system according to any one of <1> to <7>, wherein the predetermined analytical method is a method using a machine learning model to which the predetermined parameter is input, and from which the conversion coefficient is output.

<9> The characteristic table generation system according to any one of <1> to <8>, further comprising a signal generation section which is configured to obtain a crest value of the pulse using the predictive voltage characteristic table generated by the table generation section, and which is configured to generate the drive signal using the pulse having the crest value obtained.

<10> The characteristic table generation system according to any one of <1> to <9>, wherein the data acquisition section, the conversion coefficient generation section, and the table generation section are disposed in an external device located outside a liquid jet recording device incorporating a liquid jet head having the jet section.

<11> The characteristic table generation system according to any one of <1> to <9>, wherein the data acquisition section, the conversion coefficient generation section, and the table generation section are disposed in a liquid jet recording device incorporating a liquid jet head having the jet section.

<12> The characteristic table generation system according to <11>, wherein the data acquisition section, the conversion coefficient generation section, and the table generation section are disposed in the liquid jet head.

<13> A method of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the method comprising: obtaining a measured viscosity characteristic table defining a measured characteristic curve between viscosity and temperature of the liquid, and a predetermined parameter separately, as input data; generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and performing the conversion process using the measured viscosity characteristic table and the conversion coefficient generated to thereby generate the predictive voltage characteristic table.

<14> A program of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the program making a computer execute a process comprising: obtaining a measured viscosity characteristic table defining a measured characteristic curve between viscosity and temperature of the liquid, and a predetermined parameter separately, as input data; generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and performing the conversion process using the measured viscosity characteristic table and the conversion coefficient generated to thereby generate the predictive voltage characteristic table.

<15> A non-transitory computer-readable storage medium storing a program of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the program making a computer execute a process including: obtaining a measured viscosity characteristic table defining a measured characteristic curve between viscosity and temperature of the liquid, and a predetermined parameter separately, as input data; generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and performing the conversion process using the measured viscosity characteristic table and the conversion coefficient generated to thereby generate the predictive voltage characteristic table.

What is claimed is:

1. A characteristic table generation system configured to generate a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the characteristic table generation system comprising:

a data acquisition section configured to obtain a measured viscosity characteristic table defining a measured characteristic curve between viscosity and temperature of the liquid, and a predetermined parameter separately, as input data;

a conversion coefficient generation section configured to generate a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and a table generation section configured to perform the conversion process using the measured viscosity characteristic table and the conversion coefficient generated by the conversion coefficient generation section to thereby generate the predictive voltage characteristic table.

2. The characteristic table generation system according to claim 1, wherein the predetermined parameter includes at least one of a specific gravity of the liquid and a physical property value obtained using the specific gravity of the liquid.

3. The characteristic table generation system according to claim 2, wherein the conversion process includes:

a preliminary process of generating a preliminary characteristic curve representing a relationship between a voltage value and temperature from the measured characteristic curve using the conversion coefficient, and an add operation of adding a voltage shift amount to the voltage value in the preliminary characteristic curve to thereby generate the predictive characteristic curve, and wherein the predetermined parameter further includes at least one of parameters of:

a number of drops corresponding to a number of the pulses included in a unit period in the drive signal, a viscosity value of the liquid at a reference temperature, the voltage shift amount, and a voltage sensitivity of the liquid corresponding to a variation per unit voltage in either one of ejection speed of the liquid and a drop volume of the liquid when the liquid is jetted at the reference temperature.

4. The characteristic table generation system according to claim 3, wherein the voltage sensitivity of the liquid is generated based on a target value of either one of the ejection speed of the liquid and the drop volume of the liquid, using a second analytical method as the predetermined analytical method which takes the target value of either one of the ejection speed of the liquid and the drop volume of the liquid as the explanatory variable, and which takes the voltage sensitivity of the liquid as the objective variable.

5. The characteristic table generation system according to claim 1, wherein the conversion process includes:

a preliminary process of generating a preliminary characteristic curve representing a relationship between a voltage value and temperature from the measured characteristic curve, using the conversion coefficient, and an add operation of adding a voltage shift amount to the voltage value in the preliminary characteristic curve to thereby generate the predictive characteristic curve, and wherein the voltage value added with the voltage shift amount corresponds to either one of a voltage value with which a standard ejection speed of the liquid is obtained as the predetermined standard value, and a voltage value with which a standard drop volume of the liquid is obtained as the predetermined standard value, when the liquid is jetted from the jet section.

6. The characteristic table generation system according to claim 5, wherein using a third analytical method as the predetermined analytical method which includes at least one of a parameter representing a viscosity value of the liquid at a reference temperature and a parameter representing presence or absence of common drive in the drive signal in the explanatory variable, and which takes the voltage shift amount as the objective variable, the voltage shift amount is generated based on the explanatory variable including at least one of the parameters.

7. The characteristic table generation system according to claim 6, wherein the explanatory variable in the third analytical method further includes at least one of parameters of:

a head rank value which corresponds to the voltage value with which a predetermined ejection speed is achieved when a predetermined test liquid is jetted from the jet section, and which is a value inherent in a liquid jet head having the jet section, a type of the liquid jet head, a specific gravity of the liquid, a voltage sensitivity of the liquid corresponding to a variation per unit voltage in either one of ejection speed of the liquid and a drop volume of the liquid when the liquid is jetted at the reference temperature, and a surface tension value of the liquid.

8. The characteristic table generation system according to claim 1, wherein the predetermined analytical method is a method using a machine learning model to which the predetermined parameter is input, and from which the conversion coefficient is output.

9. The characteristic table generation system according to claim 1, further comprising a signal generation section which is configured to obtain a crest value of the pulse using the predictive voltage characteristic table generated by the table generation section, and which is configured to generate the drive signal using the pulse having the crest value obtained.

10. The characteristic table generation system according to claim 1, wherein the data acquisition section, the conversion coefficient generation section, and the table generation section are disposed in an external device located outside a liquid jet recording device incorporating a liquid jet head having the jet section.

11. The characteristic table generation system according to claim 1, wherein the data acquisition section, the conversion coefficient generation section, and the table generation section are disposed in a liquid jet recording device incorporating a liquid jet head having the jet section.

12. The characteristic table generation system according to claim 11, wherein the data acquisition section, the conversion coefficient generation section, and the table generation section are disposed in the liquid jet head.

13. A method of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the method comprising:

obtaining a measured viscosity characteristic table defining a measured characteristic curve between viscosity and temperature of the liquid, and a predetermined parameter separately, as input data;

generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and performing the conversion process using the measured viscosity characteristic table and the conversion coefficient generated to thereby generate the predictive voltage characteristic table.

14. A non-transitory computer-readable storage medium storing a program of generating a characteristic table as a predictive voltage characteristic table for defining a predictive characteristic curve between temperature and a voltage value representing a crest value of at least one pulse based on a predetermined standard value in a drive signal which includes the pulse and is applied to a jet section configured to jet liquid, the program making a computer execute a process including:

obtaining a measured viscosity characteristic table defining a measured characteristic curve between viscosity and temperature of the liquid, and a predetermined parameter separately, as input data;

generating a conversion coefficient used when performing a conversion process from the measured characteristic curve into the predictive characteristic curve based on the predetermined parameter using a first analytical method as a predetermined analytical method which takes the predetermined parameter as an explanatory variable, and which takes the conversion coefficient as an objective variable; and performing the conversion process using the measured viscosity characteristic table and the conversion coefficient generated to thereby generate the predictive voltage characteristic table.

* * * * *